Figure 1:
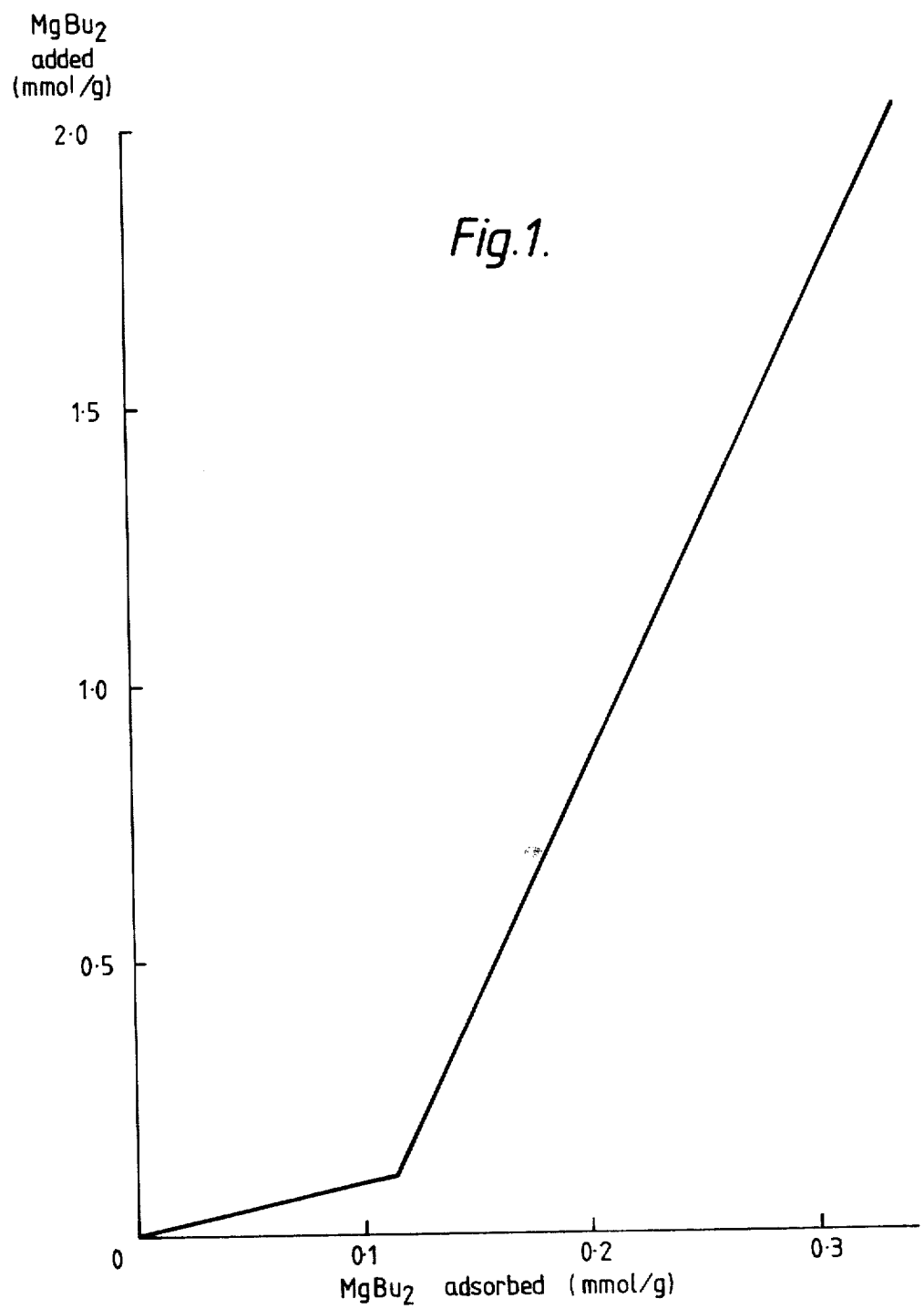

United States Patent [19]

Bottrill

[11] Patent Number: 4,473,672
[45] Date of Patent: Sep. 25, 1984

[54] POLYMER COMPOSITION, PRODUCTION AND USE

[75] Inventor: Martin Bottrill, Hertfordshire, England

[73] Assignee: Imperial Chemical Industries PLC, London, England

[21] Appl. No.: 363,229

[22] Filed: Mar. 29, 1982

[30] Foreign Application Priority Data

Apr. 9, 1981 [GB] United Kingdom ............... 8111145

[51] Int. Cl.$^3$ ................... C08F 10/00; C08F 4/02; C08L 23/02; C08K 3/34
[52] U.S. Cl. .................... 523/215; 523/200; 523/216; 523/217; 524/779; 524/786; 524/789; 524/790; 524/791; 526/129
[58] Field of Search ............. 523/215, 216, 217, 200; 524/779, 786, 789, 790, 791

[56] References Cited

U.S. PATENT DOCUMENTS

| | | | |
|---|---|---|---|
| 3,300,329 | 1/1967 | Orsino et al. | 524/779 |
| 3,503,785 | 3/1970 | Kruse | 117/62.2 |
| 3,578,629 | 5/1971 | McManimie | 260/41 |
| 3,704,271 | 11/1972 | Prahl | 260/17.4 |
| 4,097,447 | 6/1978 | Howard | 260/42.14 |
| 4,104,243 | 8/1978 | Howard | 523/333 |
| 4,187,210 | 2/1980 | Howard, Jr. | 260/42.14 |
| 4,263,168 | 4/1981 | Rochefort et al. | 526/129 |
| 4,301,029 | 11/1981 | Caunt et al. | 252/429 B |
| 4,324,691 | 4/1982 | Hartshorn et al. | 526/129 |
| 4,329,252 | 5/1982 | Gavens et al. | 526/129 |
| 4,383,096 | 5/1983 | Shida et al. | 526/129 |
| 4,385,161 | 5/1983 | Caunt et al. | 526/129 |

FOREIGN PATENT DOCUMENTS

| | | |
|---|---|---|
| 768272 | 6/1970 | Belgium . |
| 52331 | 5/1982 | European Pat. Off. . |
| 810576 | 3/1959 | United Kingdom . |
| 916132 | 1/1960 | United Kingdom . |
| 838028 | 6/1960 | United Kingdom . |
| 859696 | 1/1961 | United Kingdom . |
| 869391 | 5/1961 | United Kingdom . |
| 1056247 | 1/1967 | United Kingdom . |
| 1420315 | 1/1976 | United Kingdom . |
| 1436426 | 5/1976 | United Kingdom . |
| 1480530 | 7/1977 | United Kingdom . |
| 2028842 | 8/1978 | United Kingdom . |

*Primary Examiner*—Herbert J. Lilling
*Attorney, Agent, or Firm*—Cushman, Darby & Cushman

[57] ABSTRACT

A polymer composite is produced by polymerizing an olefine monomer in the presence of a catalyst system obtained by treating a filler material with (a) an organic magnesium compound which contains halogen or (b) an organic magnesium compound and thereafter with a halogen-containing compound; and then with a transition metal compound, which is preferably titanium tetrachloride, adding an organic metal activator compound and continuing the polymerization to obtain a composite containing desired proportions of polymer and filler. The filler may be carbon, an aluminosilicate such as mica or talc, or glass-fibre. Homogeneous composites, in respect of the distribution of filler in various size fractions, can be obtained. Composites having good flow characteristics may be obtained. The composites may be formed directly into shaped articles by suitable shaping techniques. Alternatively, the composite may be blended with a polymeric material.

11 Claims, 2 Drawing Figures

Fig. 2.

A     $R^1_a MgX_{(2-a)}$

B     $R^2_b SiZ_{(4-b)}$

C     $R^3 COZ$

D     $R^4 Z_c$

E     $MO_d R^5_e X_n$

F     $CH_2 = CHR^7$

G     $R^8 COOR^9$

POLYMER COMPOSITION, PRODUCTION AND USE

The present invention relates to a process of producing a polymer composition which is a composite material containing an olefine polymer and a filler, the composition thus obtained and shaped articles formed from the composition.

The formation of compositions containing a polyolefine and a filler material has been known for some time. Typically such compositions are obtained by mixing together separate components which are the olefine polymer and the filler material. There have also been proposals for the production of composite materials by carrying out the polymerisation of the olefine monomer in the presence of the filler material. Processes of this type are described, inter alia, in Belgium Pat. No. 768272, British Pat. Nos. 1 056 247, 1 420 315 and 1 480 530 and in U.S. Pat. Nos. 3,503,785, 3,578,629, 3,704,271 and 4,187,210. In the most recent of these proposals, as defined in British Pat. No. 1 480 530 and U.S. Pat. No. 4,187,210, both in the name of E I Du Pont de Nemours and Company, it is indicated that when using a transition metal halide such as titanium tetrachloride as a component of the polymerisation catalyst, the halogen content of this material must first be removed and the material converted into an oxide. Carrying out this process involves an oxidation treatment at a relatively high temperature for a period of many hours.

According to the present invention there is provided a process for the production of a polyolefine composition which is a composite material comprising an olefine polymer and a filler material wherein the filler material forms from 10 up to 90% by weight of the composition, said process comprising the steps of (1) treating the filler material with (a) an organic magnesium halide compound or (b) an organic magnesium compound followed by a halogen-containing compound;

(2) adding to the product of stage (1) at least one compound of a transition metal of Group IVA, VA or VIA of the Periodic Table;

(3) effecting the polymerisation of at least one olefine monomer in the presence of (A) the product of stage (2) and also of (B) an organic compound of aluminium, an organic compound of a non-transition metal of Group IIA of the Periodic Table, or a complex of an organic compound of a non-transition metal of Group IA or IIA of the Periodic Table together with an organic aluminium compound; and (4) terminating the polymerisation when a sufficient quantity of the at least one olefine monomer has been polymerised for the proportion of filler material in the composition thus formed to be at a desired level in the range from 10 up to 90% by weight of the composition.

In the accompanying drawings,

FIG. 1 is a graphical representation showing the relationship between the amount of magnesium dibutyl adsorbed by mica to the amount of magnesium dibutyl added to mica; and FIG. 2 illustrates compounds which may be used in the present invention, the compounds being represented by the generic formulae A to G.

All references herein to the Periodic Table are to the Short Periodic Table as set out inside the back cover of "General and Inorganic Chemistry" by J. R. Partington, Second Edition, published by MacMillan and Company Limited, London, in 1954.

A wide range of filler materials may be used in accordance with the process of the present invention and these include organic and inorganic materials. The organic materials are other than olefine polymers and suitable organic materials include vinyl chloride polymers, vinylidene dichloride polymers, acrolein polymers, vinyl alcohol polymers and polychloral. The term "polymer" is used herein to include homopolymers and copolymers derived from two or more monomers. The filler materials are conveniently inorganic materials including carbon, for example as graphite or carbon black, and aluminosilicates such as the aluminosilicate clays or more preferably the plate-like materials such as mica, talc and vermiculite. Other inorganic filler materials which may be used include fibrous materials such as glass-fibre. Useful products have been obtained using, as the filler material, carbon black, talc, vermiculite and particularly mica. If desired more than one filler material may be used, for example a mixture of mica and glass fibre or a mixture of mica and vermiculite.

In stage (1) of the process, the filler is treated with an organic magnesium compound and, as described in more detail hereafter, may also be treated with a halogen-containing compound. The organic magnesium compound may be a compound in which hydrocarbon or oxyhydrocarbon groups or halogen atoms are attached to the magnesium atom with the proviso that the atoms attached to the magnesium are not all halogen. Thus, suitable organic magnesium compounds which may be used include compounds of the formula A in the attached formula drawings wherein:

each $R^1$, which may be the same or different, is a hydrocarbon radical or an oxyhydrocarbon radical;

each X, which may be the same or different, is a halogen atom; and a has a value such that $0 < a \leq 2$.

The groups $R^1$ are typically alkyl groups or alkoxy groups in which the hydrocarbon group contains from 1 up to 20 carbon atoms and especially from 1 up to 6 carbon atoms. Whilst the groups $R^1$ may be oxyhydrocarbon radicals only, it is preferred that the groups $R^1$ include a hydrocarbon radical and it is particularly preferred that all of the groups $R^1$ are hydrocarbon radicals. The group X is preferably a halogen atom other than fluorine, and it is particularly preferred that X is a chlorine or bromine atom.

The organic magnesium compound of formula A may be a hydrocarbon magnesium oxyhydrocarbon compound such as ethyl magnesium ethoxide. It is preferred that the organic magnesium compound is either a hydrocarbon magnesium halide such as a Grignard reagent, or a dihydrocarbon magnesium compound. Examples of hydrocarbon magnesium halides are ethyl magnesium chloride and butyl magnesium bromide, which may be complexed with a Lewis Base compound such as an ether, and examples of dihydrocarbon magnesium compounds are diethyl magnesium and dibutyl magnesium. It is preferred that the organic magnesium compound is one which is soluble in hydrocarbon solvents such as, for example, hexane, heptane, octane, decane or dodecane or mixtures of the isomers thereof.

In stage (1), the filler material may be treated with a halogen-containing compound. If an organic magnesium halide compound is used, there is no need to use a separate halogen-containing compound, although such a compound may be used if desired. If the organic magnesium compound does not contain halogen, then it is necessary that a separate halogen-containing compound is also used. If a separate halogen-containing compound is used in stage (1), this separate halogen-containing compound is added to the filler material after the organic magnesium compound has been added to the filler material. Thus, if stage (1) is effected using an organic magnesium compound and a separate halogen-containing compound, stage (1) is carried out in two steps wherein the filler material is contacted first with the organic magnesium compound and thereafter the halogen-containing compound is added to the mixture of filler material and organic magnesium compound.

The halogen-containing compound which may be used in stage (1) is conveniently a material selected from the group of hydrogen halides, boron halides, aluminium halides, halogens, interhalogen compounds and halides of elements of Groups IVB, VB or VIB of the Periodic Table.

The halogen-containing compound is preferably a chlorine-containing compound. If the halogen-containing compound is a halide of an element of Groups IVB, VB or VIB of the Periodic Table, it is preferred that this is a compound of an element of the second or third series. The halogen-containing compound may be a hydrogen halide, a boron halide, an organic aluminium halide, a silicon halide of the formula B, a carboxylic acid halide of the formula C, a hydrocarbyl halide of the formula D, a phosphorus halide, a phosphorus oxyhalide, sulphuryl chloride, phosgene, nitrosyl chloride, chlorine, bromine, a chlorinated polysiloxane or an ammonium hexafluorosilicate. In the formulae B, C and D, the various symbols have the following significance:

each $R^2$, which may be the same or different, is a hydrogen atom or a hydrocarbon radical;

$R^3$ is a hydrocarbon radical;

$R^4$ is the residue obtained by removing one or more hydrogen atoms from a hydrocarbon compound;

each Z, which may be the same or different, is a halogen atom other than fluorine;

b is 0 or an integer from 1 up to 3; and c is an integer from 1 up to 10.

In the silicon halides of formula B, it is preferred that $R^2$ is hydrogen, an alkyl group containing 1 up to 6 carbon atoms or an aryl, alkaryl or aralkyl group containing 6 up to 15 carbon atoms. In the carboxylic acid halides of formula C, it is preferred that $R^3$ is an alkyl group containing 1 up to 4 carbon atoms or an aryl, alkaryl or aralkyl group containing 6 up to 12 carbon atoms. In the hydrocarbyl halides of formula D, the group $R^4$ may be a carbon residue or may include hydrogen atoms and Z, or each Z, is preferably attached to an aliphatic carbon atom.

The silicon halides of formula B include silicon tetrachloride, silicon tetrabromide and halosilanes such as trichlorosilane, diethyl silicon dichloride, monobutyl silicon trichloride and monoethyl silicon trichloride.

The carboxylic acid halides of formula C include acetyl chloride, benzoyl chloride and p-methylbenzoyl chloride.

The hydrocarbyl halides of formula D include carbon tetrachloride, chloroform, and 1,1,1-trichloroethane.

Suitable materials for use as the halogen-containing compound are halogenating agents by which is meant a halogen-containing compound which, when reacted with the filler material, or the product of reacting the filler material with the organic magnesium compound, gives a reaction product having an increased halogen content.

To avoid the use of excessively large quantities of the organic magnesium compound in stage (1), it is desirable that the filler material is essentially free of water. While some filler materials such as mica may occur, or may be available, with little adsorbed water, other filler materials will need to be subjected to a suitable treatment to remove adsorbed water. The treatment may include heating to elevated temperature, the use of reduced pressure, or both, and the atmosphere used to effect this drying step should itself be dry. The drying step will be dependent on the nature of the filler material and is conveniently effected at a temperature in excess of 100° C. preferably in a dry inert atmosphere, for example by passing a stream of dry nitrogen over, or through, the filler material. Alternatively, an azeotropic drying procedure can be effected using a hydrocarbon liquid such as toluene. It is preferred that the level of water adsorbed on the filler material is less than 1 millimole per gramme of filler material and it is particularly preferred that the amount of adsorbed water is less than 0.1 millimole, and especially less than 0.05 millimole, per gramme of filler material.

The amount of the organic magnesium compound which is reacted with the filler material may be varied quite considerably. In general, the amount of the organic magnesium compound used should be sufficient to give a catalyst having a satisfactory activity and this will vary in dependence on the particular monomer, or monomer mixture, which is polymerised in stage (3). Conveniently, when the monomer to be polymerised is ethylene, or a mixture containing ethylene as a major proportion, the amount of the organic magnesium compound may be no more than that required to saturate the surface of the filler, and is typically from 0.1 up to 0.9 times, preferably at least 0.5 times, the amount required to saturate the surface of the filler. When the monomer to be polymerised is propylene, or another higher olefine, the amount of the organic magnesium compound may be in excess of that required to saturate the surface, but typically does not exceed 20 times the amount required to saturate the surface and conveniently is used in an amount of from 4 to 10 times that required to saturate the surface. The quantity of the organic magnesium compound required to saturate the surface is determined by contacting, at ambient temperature (about 15° to 30° C.), a known quantity of the filler material with solutions containing differing quantities of the organic magnesium compound. The mixture is stirred for a period of time, which is typically one hour, and the quantity of the organic magnesium compound remaining in the supernatant liquid is then determined. From this measurement it is possible to calculate how much of the organic magnesium compound has been adsorbed onto the filler material for each gramme of filler. A graph may then be plotted which relates the amount of adsorbed organic magnesium compound with the amount of organic magnesium compound in solution. When the filler is mica, we have found that the graph obtained is not a straightline graph but shows a discontinuity at which the slope of the graph changes, and although adsorption occurs both below and above the discontinuity, the rate of adsorption decreases beyond the discontinuity. The discontinuity is taken as representing the saturation of the surface of the filler. A typical graphical relationship for the adsorption of magnesium dibutyl on mica is shown in FIG. 1 of the accompanying drawings.

With typical samples of mica, we have found that saturation occurs using about 0.1 millimoles of magnesium dibutyl for each gramme of mica.

We have found that, if the quantity of the organic magnesium compound is in excess of that required to saturate the surface of mica, fragmentation of the mica particles occurs as the quantity of the added organic magnesium compound is increased.

Thus, the present invention includes a process for fragmenting particles of mica which comprises suspending particles of mica in a liquid hydrocarbon and adding to the suspension a quantity of an organic magnesium compound in an amount which is in excess of that required to saturate the surface of the mica.

The quantity of the organic magnesium compound added to cause fragmentation is conveniently from 5 up to 10 times that required to cause saturation of the surface of the mica. It will be appreciated that in producing olefine polymer composition wherein the filler material is mica by the process of the present invention, when stage (1) of the process uses the organic magnesium compound in a quantity in excess of that required to saturate the surface of the mica, fragmentation of the mica will occur in stage (1) and this will result in the production of an olefine polymer/mica composition wherein at least some of the mica particles are of a smaller size than in the mica starting material. Hence, this provides a procedure for producing an olefine polymer-filler composition containing a filler of small particle size.

In stage (1) of the process of the present invention, the organic magnesium compound is conveniently added to the filler material as a liquid medium. The process can be effected by suspending the filler material in an inert liquid such as an aliphatic hydrocarbon and adding to this suspension a solution of the organic magnesium compound in an inert liquid which is conveniently, but not necessarily, the same liquid as is used for suspending the filler.

The organic magnesium compound can be added to the filler material at any suitable temperature, for example, from 0° C. up to 100° C., and conveniently at ambient temperature, that is from about 15° C. up to about 30° C. After adding the organic magnesium compound to the filler material, reaction is effected by allowing the materials to remain in contact, conveniently by stirring the mixture, for a period of time which is typically from 10 seconds up to 20 hours, for example, 30 seconds up to 6 hours. After the desired period of contacting, the treated filler may be then subjected to the next step in stage (1) of the process or may be subjected to stage (2) without being separated from the liquid medium. Alternatively, particularly if a large excess of the organic magnesium compound has been used, the solid may be separated from the liquid medium and may be washed several times before it is treated further.

If stage (1) is carried out using a halogen-free organic magnesium compound, then stage (1) should include a treatment with a halogen-containing compound. When a halogen-containing compound is used in addition to the organic magnesium compound, the halogen-containing compound is added in a subsequent step, after the treatment of the filler with the organic magnesium compound. The amount of the halogen-containing compound which is used may be in a large excess relative to the amount of the organic magnesium compound used. Alternatively, the amount of the halogen-containing compound added is not more than a slight excess over the amount which is totally adsorbed by the treated filler. In this case, the amount of the halogen-containing compound is typically not more than slightly in excess of one mole of the halogen-containing compound for each mole of the organic magnesium compound which has been added to, and adsorbed upon, the filler, and is preferably an amount of up to two moles of the halogen-containing compound for each mole of the organic magnesium compound added to, and adsorbed upon, the filler.

The halogen-containing compound is conveniently added in a liquid form to the treated filler material. The addition may be effected using a solution of the halogen-containing compound in an inert solvent or, if an excess of the halogen-containing compound is being used and the halogen-containing compound is a liquid, it is possible to use the undiluted liquid halogen-containing compound as the only material for treatment. If a gaseous halogen-containing compound is being used, this may be used as a solution in a suitable inert liquid medium or in the gas phase, either alone or in admixture with an inert gas such as nitrogen.

The reaction with the halogen-containing compound can be effected at ambient temperature or even below, but temperatures which may be considerably in excess of ambient temperature, for example up to 100° C., may be used depending on the particular halogen-containing compound. When using carbon tetrachloride as the halogen-containing compound, we have found that the treatment may be effected conveniently at ambient temperature but when using silicon tetrachloride the temperature is preferably at least 60° C.

The reaction of the halogen-containing compound with the treated filler is conveniently effected at the desired temperature for a time of from 10 seconds up to 20 hours, for example, from 30 seconds up to 6 hours.

If an excess of the halogen-containing compound has been used, it is generally preferred to separate the treated filler from the liquid medium and thereafter wash it several times before subjecting it to stage (2) of the process. However, if there is no reaction between the excess of the halogen-containing compound and the reagent used in the stage subsequent to stage (1), it is not necessary to separate and wash the product of stage (1) before effecting the subsequent stage.

Generally, we have found that after the filler has been treated with the organic magnesium compound, it is preferred that the product obtained has no appreciable reducing properties when used in stage (2) of the process. It is believed that any reducing properties result from the presence of magnesium-carbon bonds derived from the organic magnesium compound adsorbed on the surface of the filler. The treatment with the halogen-containing compound is believed to result in the halogenating of magnesium-carbon bonds. Thus, it is desirable to use the halogen-containing compound in an amount sufficient to halogenate all, or substantially all, of the magnesium-carbon bonds present on the surface. The amount of the halogen-containing compound which is required to cause the desired halogenation of the magnesium-carbon bonds is dependent on the amount of magnesium-carbon bonds and on the nature of the halogen-containing compound, and in particular whether a polyhalogenated compound is being used. However, in general, if the halogen-containing compound is being used in less than an excess amount relative to the amount of adsorbed organic magnesium compound, we prefer to use from 0.6 up to 1.0 moles of the halogen-containing compound for each mole of the organic magnesium compound adsorbed on the surface of the filler material. If a low proportion of the halogen-containing compound is used, particularly not more than one mole of the halogen-containing compound for each mole of the organic magnesium compound which is adsorbed on the surface of the filler, then it is generally not necessary to separate and wash the filler before subjecting the filler to stage (2) of the process.

After being treated in accordance with stage (1) of the process of the present invention, the filler is subjected to stage (2) of the process in which it is treated with at least one transition metal compound. Suitable transition metal compounds are those represented by formula E in the attached formula drawings, wherein:

M is a transition metal of Group IVA, VA or VIA of the Periodic Table;

$R^5$ is a hydrocarbon radical, a substituted hydrocarbon radical or a group $OR^6$;

$R^6$ is a hydrocarbon radical or a substituted hydrocarbon radical;

X is as hereinbefore defined;

d is 0 or 1;

e is 0 or a number up to the valency of M; and $2d+e+n$ to equal to the valency of M; with the proviso that 2d is less than the valency of M.

The at least one transition metal compound of formula E which can be used in stage (2) of the process of the present invention, can be a metal halide, a metal oxyhalide, a metal hydrocarbon or a metal oxyhydrocarbon compound and may include a mixture of substituents attached to the metal atom. The metal M may be vanadium, zirconium or preferably titanium. Metal halides which may be used in the process of the present invention include titanium tetrachloride and vanadium tetrachloride and metal oxyhalides which may be used include vanadium oxytrichloride. Metal oxyhydrocarbon compounds include metal alkoxy compounds and metal alkoxy halide compounds such as tetrakis (ethoxy) titanium, tetrakis (butoxy) titanium, bis(isopropoxy)titanium dichloride and bis(butoxy) titanium dichloride. A wide range of metal hydrocarbon compounds may be used and suitable materiaas of this type include titanium tetrabenzyl, zirconium tetrabenzyl, zirconium tetraneophyl and tris ($\pi$-allyl) chromium, and other compounds of this type are disclosed, inter alia, in British patent specification Nos. 1 265 747 and 1 513 673. We have obtained useful results when the transition metal compound is titanium tetrachloride.

The treatment with the at least one transition metal compound may be carried out at a temperature which is conveniently in the range from 0° C. up to the boiling temperature of the liquid medium in which the reaction is being carried out.

The temperature at which the treatment with the at least one transition metal compound is effected is dependent on the composite to be produced and, in particular, the polymeric component of the composite. Thus, treatment at ambient temperature has been found to be satisfactory, if the composite is to contain an ethylene polymer. However, for the production of a composite containing a propylene polymer, treatment at a higher temperature, for example, from 60° C. up to 100° C., is preferred.

The reaction may be carried out using a solution of the transition metal in an appropriate inert liquid medium or it may be carried out by suspending the treated filler material in the undiluted transition metal compound when the latter is liquid under the desired reaction conditions. If the reaction is carried out using the undiluted liquid transition metal compound, then the quantity of the transition metal compound typically will be considerably in excess of that which is required. Alternatively, if a solution of the transition metal compound is being used, then the amount of transition metal compound which is present may be an amount which is calculated to be just sufficient to react with the treated filler material. If a solution of the transition metal compound is used, the concentration of the transition metal compound may be in the range from 0.0001 up to 50% by volume, depending on the particular procedure used and the monomer to be polymerised. Preferably, for the production of an ethylene polymer composition, the concentration of the transition metal does not exceed 2% by volume, whereas for the higher olefine monomers such as propylene, the concentration of the transition metal compound may be higher, for example at least 30% by volume of the solution, but lower concentrations can be used if it is desired to avoid the need to remove excess quantities of unreacted transition metal compound. The reaction between the transition metal compound and the treated filler material may be effected by stirring the materials together at the desired reaction temperature. The materials are conveniently allowed to remain in contact for a period of from 10 seconds up to 20 hours, for example, from 30 seconds up to 6 hours.

Some of the transition metal compounds which can be used in the process of the present invention are relatively volatile. Thus, it is possible to effect stage (2) of the process of the present invention by passing through, or over, the treated filler material from a previous stage, a gaseous phase which is, or which contains, the transition metal compound. The gaseous phase containing the transition metal compound may be obtained by bubbling an inert gas such as nitrogen through an undiluted liquid transition metal compound. As will be described in more detail hereafter, we have obtained a particularly useful product by effecting stage (2) by subliming the equi-molar complex material, titanium tetrachloride - ethyl benzoate, through the treated filler material.

When the reaction between the transition metal compound and the treated filler material has been completed, if the product obtained is in contact with a liquid phase containing an excess quantity of the transition metal compound, the reaction product is separated from liquid reaction medium and washed several times to remove the excess unreacted transition metal compound from the filler material. However, if the amount of the transition metal compound was merely sufficient to react with the treated filler material, there is no need to separate the treated filler from the reaction medium.

To avoid the need for separation and washing steps at the end of stage (2), an amount of transition metal compound can be used which does not exceed, and preferably is less than, the amount of the magnesium compound which is used. The amount of the transition metal compound used in such a procedure may be less than 0.5 moles of the transition metal compound for each mole of the magnesium compound which has been adsorbed by the filler material, for example from 0.2 up to 0.4 moles of transition metal compound for each mole of adsorbed organic magnesium compound.

It will be appreciated that the quantities of the various reagents which are used will be dependent on the nature of the particular reagents but that suitable quantities may be determined by relatively simple experiments. It will also be appreciated that it is desirable to avoid the need for separation and washing steps at various stages of the process. It is preferred that stages (1) and (2) are effected with separation and washing steps at the end of stage (2) only. It is especially preferred to effect stages (1) and (2) with no separation or washing steps.

In stage (3) of the process of the present invention, the product from stage (2) is used, together with an organic compound of aluminium or of a metal of Group IIA of the Periodic Table or a complex of an organic compound of a metal of Group IA or IIA of the Periodic Table with an organic compound of aluminium, to effect the polymerisation of at least one olefine monomer.

Olefine monomers which may be used in the process of the present invention include materials having the formula F as set out in the accompanying formula drawings. In the formula F, $R^7$ is a hydrogen atom or a hydrocarbon radical.

Thus, olefine monomers which may be used in stage (3) of the present invention include ethylene, propylene, butene-1, pentene-1, hexene-1, 4-methylpentene-1, styrene, 1,3-butadiene or any other olefine which satisfies formula F. Preferred olefine monomers are aliphatic compounds containing not more than 10 carbon atoms. The monomers may be homopolymerised or may be copolymerised together. If a copolymerisation is being effected, a mixture having essentially the same composition may be used throughout the polymerisation process or a sequential polymerisation process may be used such as described in British Pat Nos. 970478, 970479 and 1 014 944.

The organic compound of a metal which is used in stage (3), together with the product of stage (2), to polymerise the olefine monomer may be an organic magnesium compound of formula A, or a complex or mixture thereof with an organic aluminium compound. Alternatively, a complex of a metal of Group IA with an organic aluminium compound may be used, for example, a compound of the type lithium aluminium tetraalkyl. However, it is preferred that an organic aluminium compound is used and the preferred type of organic aluminium compound is a trihydrocarbon aluminium compound such as an aluminium trialkyl compound, particularly one in which the alkyl group contains from 1 up to 8 carbon atoms, for example, aluminium triethyl, aluminium tributyl or aluminium trioctyl.

The polymerisation of the olefine monomer can be carried out in any known manner. It is convenient to carry out the polymerisation in the presence of a liquid suspending medium, particularly an inert hydrocarbon liquid. However, it is not necessary that the polymerisation is carried out in the presence of an inert liquid medium since it is possible to carry out polymerisation in the absence of such a liquid medium when the polymerisation may be carried out either in liquid olefine monomer or in the presence of the olefine monomer in the gaseous state.

If polymerisation is effected in the presence of a liquid medium, the polymerisation catalyst may be present in the solid phase, on the surface of the filler material, or in the liquid phase. It is believed that in the process of the present invention the polymerisation catalyst is present predominantly on the surface of the filler material. However, it will be appreciated that part of the catalyst system may be present either dissolved in the liquid medium, or dispersed in the liquid medium separately from the filler material, particularly if no washing steps are used after stages (1) and (2).

Polymerisation may be carried out under conditions of temperature and pressure known for olefine polymerisation processes. Thus the polymerisation is conveniently carried out at a temperature of between 0° and 100° C. and in particular at a temperature between 60° and 90° C., higher polymerisation temperatures, for example at least 75° C., being particularly suitable for the production of composite materials having satisfactory flow characteristics. The polymerisation pressure may be any suitable pressure from sub-atmospheric up to a very high pressure but it is generally not necessary to use pressures in excess of about 70 kg per cm². The polymerisation may be carried out in the presence of reagents which affect the molecular weight of the polymer formed and, in particular, may be carried out in the presence of hydrogen. When hydrogen is used, the quantity of hydrogen will be dependent on the molecular weight of the polymer desired and also on the nature of the monomer being polymerised. Thus, if the monomer being polymerised is ethylene, the partial pressure of hydrogen is typically up to 1.5 times the partial pressure of the ethylene but will not normally exceed the partial pressure of the ethylene. Surprisingly, it has been found that the molecular weight of the ethylene polymer obtained is not appreciably effected by the presence or absence of hydrogen during the polymerisation and the ethylene polymer obtained has a relatively low molecular weight, as discussed in more detail hereafter. If the monomer being polymerised is propylene, the partial pressure of the hydrogen will not normally exceed 10% of the partial pressure of the propylene and may be as low as 0.1% of the partial pressure of propylene.

The time of the polymerisation will be dependent on a number of factors including the monomer being polymerised, the temperature and pressure of the polymerisation, and also the proportion of filler which is required in the final product. However, in general, the polymerisation time will be at least 10 minutes and will not exceed about 6 hours. Typicaaly the polymerisation time is between 30 minutes and 2 hours. Polymerisation is preferably continued to give a product containing from 35 up to 75%, and especially from 40 up to 60%, by weight of the filler material.

At the end of stage (3), the polymerisation is terminated when the required amount of polymer has been formed. Termination of the polymerisation may be effected merely by removing the olefine monomer and replacing it by a suitable inert gas such as nitrogen. Subsequently, a composition consisting of the polyolefine and the filler may be separated from the liquid reaction medium, dried and exposed to an oxygen-containing gas such as air. Alternatively, there may be added to the reaction medium a material which is effective to deactive the polymerisation catalyst which is present in the system. Suitable reagents of this type are well known and in particular include alcohols such as ethanol, isopropanol and isobutanol. After the addition of the alcohol, the olefine polymer-filler composition is separated from the liquid medium, preferably washed to remove the alcohol, and thereafter dried before being exposed to air.

If the monomer being polymerised is predominantly propylene or a higher olefine monomer, it is very desirable that the polymeric product is essentially of the stereospecific form and that only a relatively small proportion of the undesirable soluble polymer is produced. In order to obtain satisfactory forms of the higher olefine polymers, it is desirable to modify the procedure described herein. In particular, it is desirable to include a further stage in the process. This further stage is preferably effected after stage (1), and before stage (2), and in this further stage the treated filler material is subjected to a further treatment in which it is contacted with a Lewis Base compound.

The Lewis Base compound which is used in the additional stage can be any organic Lewis Base compound which has been proposed for use in a Ziegler polymerisation catalyst and which affects either the activity or stereospecificity of such a catalyst system. Thus, the Lewis Base compound may be an ether, an ester, a ketone, an alcohol, an ortho-ester, a sulphide, (a thioether), an ester of a thiocarboxylic acid (a thioester), a thioketone, a thiol, a sulphone, a sulphonamide, a fused ring compound containing a heterocyclic sulphur atom, an organic silicon compound such as a silane or siloxane, an amine, a urea, a substituted urea, thiourea, an amide or a derivative of an amide, or an organic phosphorus compound. The use of organic Lewis Base compounds has been disclosed, inter alia, in British patent specification Nos. 803 198, 809 717, 880 998, 896 509, 920 118, 921 954, 933 236, 940 125, 966 025, 969 074, 971 248, 1 013 363, 1 017 977, 1 049 723, 122 010, 1 150 845, 1 208 815, 1 234 657, 1 324 173, 1 359 328, 1 383 207, 1 423 658, 1 423 659 and 1 423 660.

Preferred Lewis Base compounds are esters which may be represented by the formula G in the attached formula drawings.

In the formula G;
 R$^8$ is a hydrocarbon radical which may be substituted with one or more halogen atoms and/or oxyhydrocarbon groups; and
 R$^9$ is a hydrocarbon radical which may be substituted by one or more halogen atoms.

The groups R$^8$ and R$^9$ may be the same or different and it is preferred that one, but not both, of the groups R$^8$ and R$^9$ includes an aryl group. The group R$^8$ is conveniently an optionally substituted alkyl or aryl group, for example, a methyl, ethyl, or especially a phenyl, a tolyl, methoxyphenyl or fluorophenyl group. The group R$^9$ is preferably an alkyl group containing up to 6 carbon atoms, for example, an ethyl or butyl group. It is particularly preferred that R$^8$ is an aryl group and R$^9$ is an alkyl group. Ethylbenzoate, the ethyl ester of 4-methoxybenzoic acid (ethyl anisate) and the methyl and ethyl esters of 4-methylbenzoic acid (methyl and ethyl p-toluate) are examples of esters of formula G.

The treatment with the Lewis Base compound is preferably effected after stage (1) of the process. The procedure in which the Lewis Base compound is used conveniently involves the addition of the Lewis Base compound, either as the neat undiluted Lewis Base compound or as a solution of the Lewis Base compound, to a suspension of the treated filler from stage (1). Although the amount of the Lewis Base compound used may be in excess of the amount of the organic magnesium compound which is adsorbed on the filler material, it is preferred that the amount of the Lewis Base compound does not exceed the amount of the organic magnesium compound which is absorbed on the filler material. Conveniently, the amount of the Lewis Base compound is in the range from 0.1 up to 1 mole, and particularly in the range from 0.25 up to 0.9 mole, of Lewis Base compound for each mole of the organic magnesium compound which is adsorbed on the filler material.

The treatment with the Lewis Base compound may be effected at temperatures of from 0° up to 100° C. and is very conveniently carried out at ambient temperature. The treatment with the Lewis Base compound may be effected for any convenient period of time which may be from 15 minutes up to 25 hours, for example, from 1 up to 20 hours.

If an excess quantity of the Lewis Base compound is used then, after the treatment with the Lewis Base compound, the treated filler is preferably separated from the reaction medium and washed with an inert liquid.

Whilst a Lewis Base compound may be incorporated into the process of the present invention in a separate stage, it will be appreciated that a Lewis Base compound may be used in one, or both, of stages (1) and (2) of the process and hence that a Lewis Base may be used without requiring a separate stage.

If the organic magnesium compound is a Grignard reagent, this may be used as a solution in an ether such as diethyl ethyl or dibutyl ether but it will be realised that other Lewis Base compounds could also be used as a solvent for the organic magnesium compound in stage (1). Alternatively, stage (1) of the process can be effected using a hydrocarbon solution containing a complex, or mixture, of an organic magnesium compound and a Lewis Base compound.

If a Lewis Base compound is used in stage (2) of the process, this may be used as a complex, or mixture, with the transition metal, conveniently in a suitable liquid medium, particularly a liquid hydrocarbon such as hexane, heptane, octane, decane or dodecane and mixtures thereof. However, we have obtained an olefine polymer-filler composition having a low degree or heterogeneity by effecting stage (2) using a solid complex of titanium tetrachloride and ethyl benzoate and subliming this complex onto the material obtained in stage (1). More specifically, stage (1) is effected using mica as the filler material, dibutyl magnesium as the organic magnesium compound and carbon tetrachloride as the halogen-containing compound, stage (2) is effected by subliming the complex of titanium tetrachloride and ethyl benzoate onto the product thus obtained and in stage (3), the resultant material is used, together with an organic metal compound, for the polymerisation of ethylene.

If the monomer being polymerised is propylene or a higher olefine monomer then stage (3) may be effected in the presence of a Lewis Base compound which is additional to any Lewis Base compound which is used in either stage (1) or (2) of the present process. When an additional Lewis Base compound is used in stage (3), it is preferred that the organo-metallic compound is an aluminium trialkyl, the Lewis Base compound is an ester of an aromatic acid, and the amount of the Lewis Base compound is from 0.2 up to 0.5 moles, especially from 0.25 up to 0.4 moles, of the Lewis Base compound for each mole of the aluminium trialkyl.

It is a preferred aspect of the present invention to effect the whole process in a single reaction vessel with no separation, or separation and washing, steps between the stages. If the filler material is mica and the monomer is ethylene, or a mixture of ethylene and a higher olefine comonomer, the process may be effected by using the reagents in stages (1) and (2) in proportions which are less than are required to saturate the surface of the mica.

More specifically there is provided a process for the production of a composite material comprising an ethylene polymer and mica, said process comprising the steps of (1) treating mica with an organic magnesium compound in an amount of not more than 0.1 millimoles of the organic magnesium compound for each gramme of mica and then adding carbon tetrachloride in an amount of less than one mole of carbon tetrachloride for each mole of the organic magnesium compound;

(2) adding to the product of stage (1), titanium tetrachloride in an amount of less than one mole of titanium tetrachloride for each mole of the organic magnesium compound;

(3) effecting the polymerisation of ethylene, or a mixture containing ethylene, in the presence of the product of stage (2) and also of an aluminium trialkyl; and (4) terminating polymerisation when the proportion of mica in the composition formed is in the range from 35 up to 75%, especially from 40 up to 60%, by weight of the composition.

The organic magnesium compound is conveniently a magnesium dibutyl. The amount of the carbon tetrachloride is preferably not more than 0.5 moles for each mole of the organic magnesium compound. The amount of the titanium tetrachloride is preferably less, on a molar basis, than the amount of carbon tetrachloride. The amount of the aluminium trialkyl is conveniently at least 5 moles for each mole of titanium tetrachloride and in general does not exceed 50 moles for each mole of titanium tetrachloride. Using this procedure, the composite material can be obtained in a single vessel without there being any need for separation steps between the various stages.

Composite materials containing propylene polymers can also be obtained without there being any need for separation steps between the various stages but this requires a modified procedure.

Thus, a process for the production of a composite material comprising a propylene polymer and mica comprises the steps of (1) treating mica with an organic magnesium compound in an amount of not more than 0.6 millimoles of the organic magnesium compound for each gramme of mica, then adding boron trichloride in an amount of from one up to two moles of boron trichloride for each mole of the organic magnesium compound, and then adding an alkyl ester of an aromatic carboxylic acid in an amount of from 0.1 up to 0.2 moles of the ester for each mole of the organic magnesium compound;

(2) adding to the product of stage (1), titanium tetrachloride in an amount of from 0.1 up to 0.2 moles of the titanium tetrachloride for each mole of the organic magnesium compound;

(3) effecting the polymerisation of propylene in the presence of the product of stage (2) and also of an aluminium trialkyl and an alkyl ester of an aromatic carboxylic acid wherein there are used from 0.2 up to 0.4 moles of the ester for each mole of the aluminium trialkyl; and (4) terminating polymerisation when the proportion of mica in the composition formed is in the range from 35 up to 75%, especially from 40 up to 60%, by weight of the composition.

The amount of the organic magnesium compound is preferably at least 0.2 millimoles of the organic magnesium compound for each gramme of mica. The amount of boron trichloride preferably does not exceed 1.25 moles of boron trichloride for each mole of the organic magnesium compound. The amount of ester used in stage (2), and the amount of titanium tetrachloride, are conveniently the same, on a molar basis. The composite material formed contains polypropylene which is typically at least 90% isotactic and which is preferably at least 95% isotactic.

The products obtained by the process of the present invention are compositions of an olefine polymer and a filler material and such compositions may have a low degree of heterogeneity. We have found that the surface of the filler material is covered by the olefine polymer to a considerable extent and by inspection, using electron microscopy, we have found that in many compositions containing not more than about 50% by weight of the filler material, the surface of the filler is completely covered by the olefine polymer. Coverage of the filler material can be confirmed by electron spectroscopy for chemical analysis (ESCA). Using ESCA we have found that as the proportion of olefine polymer increases, the signal from the filler material decreases until it is not possible to detect a signal which is characteristic of the filler material. This behaviour indicates that coverage of the filler material is occurring and, when no signal can be detected from the filler material, this indicates a complete coating of polymer, the thickness of which is about 10 nanometres, or greater.

We have determined the heterogeneity of the olefine polymer-filler composition ty sieving the composition and subjecting each sieve fraction to analysis to determine the filler content. Using this technique, we have found only relatively small variations in the filler contents of the various sieve fractions, thus demonstrating that the compositions have a low heterogeneity.

Thus, as a further aspect of the present invention there is provided a composition of an olefine polymer and a filler material wherein the filler material forms from 10 up to 90% by weight of the composition and at least 90% by weight of the composition has a heterogeneity of not more than 10.

By "heterogeneity" is meant the difference between the weight percent filler content for the size fraction with the highest weight percentage filler content and the weight percent filler content for the size fraction with the lowest weight percentage filler content, when the composition has been sieved to give at least five size fractions. Thus, if a composition has a heterogeneity of not more than 10, then if the weight percent filler content for the size fraction with the lowest weight percentage filler content is x%, the weight percent filler content for the size fraction with the highest weight percentage filler content must not exceed (x+10)%. It is preferred that at least 95%, and particularly at least 99% of the composition has a heterogeneity of not more than 10.

It is preferred that 90% by weight of the composition has a heterogeneity of less than 5, particularly of not more than 3. In particular it is preferred that, in compositions in accordance with the present invention, at least 95%, and especially at least 97%, by weight, of the composition has a heterogeneity of less than 5. In an especially preferred composition in accordance with the present invention, at least 98% by weight of the composition has a heterogentity of not more than 3.

It will be appreciated that the determination of heterogeneity is a relatively straightforward task which involves sieving the composition, and determining the weight and filler content of each sieve fraction. From the filler contents of the sieve fractions, the heterogeneity is readily determined. The proportion of the composition which has a heterogeneity of not more than 10 can be determined from the weight of each sieve fraction from which can be calculated the proportion of the total composition which is formed by any sieve fraction. If less than 100% of the composition satisfies the heterogeneity requirements, then we have found that it is typically the fractions of large or small sieve size, especially the small sieve size fractions, which are responsible for the whole composition having a heterogeneity which is greater than 10.

It will be appreciated that the particle size, and particle size distribution, of the composition will be dependent primarily on the particle size, and particle size distribution, of the filler material. The amount of olefine polymer which is present in the composition will have some effect on the particle size, and particle size distribution, of the composition but this effect will generally be of less significance.

Typically, the filler material is present in the polyolefine composition in an amount of from 35 up to 75%, and especially from 40 up to 60%, by weight of the composition.

The sieve sizes used in determining the heterogeneity of the composition will be dependent on the particle size, and particle size distribution, of the composition. For many compositions in accordance with the present invention, we have found it convenient to effect sieving to obtain particle fractions in the following size ranges: less than 53 microns; between 53 and 110 microns; between 110 and 150 microns; between 150 and 212 microns; between 212 and 250 microns; between 250 and 300 microns; between 300 and 425 microns; between 425 and 500 microns; between 500 and 710 microns; between 710 and 850 microns and in excess of 850 microns. In compositions in accordance with the present invention the olefine polymer is conveniently an ethylene polymer and the filler material is conveniently mica. Many ethylene polymer-mica compositions in accordance with the present invention have a maximum particle size of less than 425 microns. However, we have obtained a composition having a low heterogeneity and a particle size in the range from 110 microns up to 850 microns.

Compositions in accordance with the present invention may be obtained using vermiculite lamellae as the filler material.

Thus, according to a further aspect of the present invention there is provided a composition of an olefine polymer and vermiculite wherein the vermiculite forms from 10 up to 90% by weight of the composition and is in the form of vermiculite lamellae which have a thickness of less than one micron and an aspect ratio of at least 100.

Vermiculite lamellae are in the form of thin platelets which are obtainable by the chemical delamination of vermiculite using known processes such as those described in British patent specification Nos. 1 016 385, 1 076 786 and 1 119 305 and German OLS specification Nos. 2 716 152 and 2 741 859 and European patent application publication No. 0 009 311. The vermiculite lamellae may have a thickness of less than 0.5 microns, for example less than 0.05 microns or even less than 0.005 microns. The vermiculite lamellae may have an aspect ratio which is at least 1000 and which may be as high as 10000. In preferred compositions containing vermiculite lamellae, at least 90% by weight of the composition has a heterogeneity of not more than 10.

The present invention also provides a composition of an ethylene polymer or copolymer and carbon black wherein the carbon black content is from 10 up to 90% ty weight and at least 90% by weight of the composition has a heterogeneity of not more than 10. Preferably at least 99% by weight of the composition has a heterogeneity of not more than 10.

According to yet a further aspect of the present invention, there is provided a composition comprising polypropylene and a filler material wherein the content of the filler material is from 10 up to 90% by weight, at least 90% by weight of the composition has a heterogeneity of not more than 10 and wherein the polypropylene is at least 90% isotactic. Preferably at least 99% by weight of the composition has a heterogeneity of not more than 10. It is also preferred that the polypropylene is at least 95% isotactic. The term "isotactic" as used herein means the proportion of the total polymer formed which is not dissolved in the polymerisation diluent during the preparation of the composition.

In the compositions in accordance with the present invention, electronmicroscopy may be used to detect the presence of uncoated surfaces. Alternatively, ESCA may be used to deduce the presence of coatings of polymer on the surface of the filler material since the signal from the filler material is less than would be anticipated having regard to the amount of filler material which is present. Thus, in a composition of polyethylene and mica, when the composition contains 50% of polyethylene, and correspondingly 50% of mica, no signal which is characteristic of the mica can be detected. In a composition which contains 10% of polyethylene and 90% of mica, the signal from the mica is reduced in intensity and is less than 90% of the signal obtained from untreated mica. When using ESCA to study a composition of polyethylene and mica, the signal from the silicon in the mica is used to detect the presence of the mica.

According to a further aspect of the present invention there is provided a composition of an olefine polymer and a filler material, wherein the proportion by weight of the filler material is x% by weight of the composition, where x has a value of from 10 up to 90 and wherein the signal obtained from the filler material using electron spectroscopy for chemical analysis is less than x% of the signal obtained from the filler material alone.

In the compositions of the present invention in which the olefine polymer is polyethylene, we have found that the weight average molecular weight, as determined by Gel Permeation Chromatography, using a 1-2 dichlorobenzene solution of polymer which had been extracted from the composition, is in the range from 80,000 up to 500,000. The polymer was extracted from the composition by heating the composition with 1,2-dichlorobenzene for two hours at 160° C., filtering the hot mixture, precipitating the polymer with methanol and drying the polymer, which was then dissolved in 1,2-dichlorobenzene to carry out the Gel Permeation Chromatography.

The inherent viscosity of the polyethylene is typically in the range from 0.50 up to 6, and especially from 0.75 up to 4. The inherent viscosity is determined using a 0.05 weight/volume percent solution of polyethylene in 1,2,4-trichlorobenzene and is given by the relationship $$\text{Inherent viscosity} = \frac{\text{natural log of relative viscosity}}{\text{weight/volume percent polymer concentration}}$$

Polyolefine compositions in accordance with the present invention typically contain a substantial proportion of the filler material and the presence of such proportions of filler material can have an adverse effect on the processing characteristics of the composition. Preferred polyolefine compositions in accordance with the present invention have processing characteristics which permit the processing of the composition using conditions similar to those which can be used for melt processing of the olefine polymer component of the polyolefine composition.

Thus, according to a further aspect of the present invention there is provided a composition comprising polyethylene and a filler material wherein the content of the filler material is from 10 up to 90% by weight and the composition when subjected to shear at 170° C. and a shear rate of 13 sec$^{-1}$ requires an extrusion pressure of not greater than 60 kg/cm$^2$ and when subjected to shear at 170° C. and a shear rate of 52 sec$^{-1}$ requires an extrusion pressure of not greater than 90 kg/cm$^2$.

The composition preferably comprises polyethylene and mica and has a mica content of from 35 up to 75%, especially 40 to 60%, by weight. The extrusion pressure at a shear rate of 13 sec$^{-1}$ is preferably less than 45 kg/cm$^2$ and the extrusion pressure at a shear rate of 52 sec$^{-1}$ is preferably less than 65 kg/cm$^2$.

The flow characteristics at the specified shear rates are conveniently measured using a rheometer, for example a Davenport Capillary Rheometer, having a heated barrel and provided with means for measuring the pressure and a ram which can be driven at a selected, constant, velocity.

Polyolefine compositions in accordance with, or obtained by the process of, the present invention, may be used directly to form shaped articles. Alternatively, the polyolefine compositions may be blended with a quantity of a polymeric material, for example an olefine polymer which optionally contains a filler material, and the blended materials used to form shaped articles. The shaped articles produced may be of the type which have hitherto been formed using blends of polyolefine and filler. If the composition is blended with a quantity of an unfilled polymeric material, this blending may be effected using conventional blending equipment such as a high speed powder mixing device or a tumble blender or hy feeding the materials to an extruder and effecting the mixing in the extruder. The formed blend may then be processed to give shaped articles using any technique suitable for handling blends of polymers with fillers.

The technique used to form a shaped article from the compositions of the present invention will be dependent on the quantity of the filler material present in the composition and also on the molecular weight of the olefine polymer which is present in the composition. If desired, the processibility of the composition of the present invention may be improved ty the addition of a processing aid, such as, for example, a polyethylene wax or a metal salt of a long chain aliphatic carboxylic acid such as calcium stearate. If the proportion of the filler material is relatively low, that is the filler does not exceed about 60% by weight of the total composition, and the molecular weight of the polymer is not excessively high, for example, a polymer having an inherent viscosity (as hereinbefore defined) of less than 4, it is possible to process the composition using conventional processing techniques such as injection moulding. Similarly, a polyethylene composition having the flow characteristics at the specified shear rates may be suitable for processing using conventional processing techniques. However, injection moulding of the compositions generally requires severe processing conditions such as high temperatures and/or considerably higher pressures than are normally used and it is generally desirable to avoid such severe conditions. Furthermore, if the proportion of the filler material is high, or the molecular weight of the polymer is high, or both, it is generally not possible to process the composition using conventional techniques.

The polyolefine compositions of the present invention can be formed into shaped articles by using techniques common in the powder metallurgy or ceramic art. Such techniques typically involve subjecting particles of the composition to an elevated temperature and an elevated pressure. The temperature selected is preferably one at which the polymeric component of the composition softens and hence will be dependent on the nature of the polymeric component of the composition. Typically, the temperature used will be at least 100° C. and can be as high as 300° C., and more generally is in the range 120° C. up to 250° C. The pressure used is typically in the range 1 kg/cm$^2$ up to 10,000 kg/cm$^2$ preferably from about 70 kg/cm$^2$ up to 1,000 kg/cm$^2$.

One technique of forming shaped articles from the polyolefine compositions of the present invention is ty a compression moulding technique. Using such a technique, particles of the composition are placed in a mould and are then subjected to the application of pressure at an elevated temperature which is typically above the softening temperature of the polymeric component of the composition. The elevated temperature and pressure are applied to the composition for a time which is typically from 0.1 up to 10 minutes, the shaped article formed is allowed to cool below the softening temperature of the polymeric component and the mould is then opened and the shaped article is removed.

Sheets may be formed from the polyolefine composition by the use of suitable sheeting equipment. Typically, particles of the composition are placed on a moving belt on which the particles are subjected to a raised temperature and subjected to compressive forces by passing through a restricted space. The compressive forces may be provided by compression rolls. Heating of the particles of the composition may be achieved by the use of a heating zone prior to the application of the compressive forces or by the simultaneous application of heat and compressive forces, for example, by the use of one, or more, heated compression rolls. In forming sheet from the composition, it is desirable to avoid subjecting the composite to shearing forces.

The polyolefine compositions of the present invention may be shaped by an extrusion process to give shaped articles such as pipe and sheet.

Sheets, or injection mouldings, formed from the polyolefine compositions of the present invention may be subjected to further processing and give a wide variety of shaped articles. Thus, a sheet formed from the composition may be shaped by processing the sheet, at an elevated temperature, between a male and female die. Alternatively, a sheet may be subjected to hot or cold stamping using a male and female die.

Films may be obtained from the polyolefine compositions of the present invention either by a compression moulding technique or by stretching, either by pulling or rolling, a sheet which has been obtained using a procedure as hereinbefore described. The stretching may be effected in one or more directions and, in the latter case, stretching in different directions may be effected simultaneously or sequentially.

Shaped articles may be formed by a sintering technique. Thus, particles of the polyolefine composition are placed in a mould and subjected to a high pressure at a temperature which is below the softening temperature of the polymeric component of the composition. Suitable pressures are in the range from 10 kg/cm$^2$ up to 10,000 kg/cm$^2$, preferably at least 50 kg/cm$^2$ and especially at least 350 kg/cm$^2$. This procedure gives a self-supporting article which is removed from the mould and is densified by heating to a temperature which is above the softening temperature of the polymer component of the composition.

The polyolefine compositions of the present invention may be used for coating a wide range of substrates. Coating is conveniently effected by fluidising particles of the composition and dipping into the fluidised bed thus obtained a substrate which has been heated. The heated substrate causes softening or melting of the polymer component of the composition, with consequent adhesion of the composition onto the substrate. The coated material may be subjected to further treatment if desired, for example, by sintering of the coating or by passing the coated material through a heated die or heated rollers.

Sheets may be formed from the polyolefine compositions of the present invention in the manner hereinbefore described and the sheets obtained may be laminated to one or more sheets of other materials such as other polymeric materials, for example polyethylene or polypropylene, or metals such as steel or aluminium.

Shaped articles formed from the polyolefine compositions of the present invention have useful characteristics and in particular can show improved mechanical and other properties, for example low gas permeability.

Various aspects of the present invention will now be described in the following Examples. In the Examples all the operations involving the formation of the composite were conducted in an essentially oxygen- and water-free nitrogen atmosphere. All the glass apparatus was dried in an air oven at 120° C. for at least one hour and purged with nitrogen before use.

Purification of Solvents

All the solvents used were essentially pure and dry. Before use, the solvents were purged with nitrogen and evacuated to a low pressure, the purging and evacuation being repeated four times.

EXAMPLE 1

Into a three liter vessel having a sintered base and provided with a stirrer were placed two liters of an aliphatic hydrocarbon fraction which was a mixture of dodecane isomers essentially all of which had a boiling point in the range from 170° C. up to 185° C. (this material is hereafter referred to as the "aliphatic hydrocarbon fraction"). 500 g of mica ("Suzorite" Grade 150C., obtainable from Marietta Resources International Limited of Quebec, Canada) were added and the mixture was stirred without heating.

To the stirred mixture were added 57.2 cm$^3$ of a 0.67 M solution of magnesium dibutyl (an equimolar mixture of primary and secondary dibutyl magnesium) in an isoparaffin fraction, essentially all of which had a boiling temperature in the range from 117° C. up to 135° C. (hereafter this liquid medium will be referred to as the "isoparaffin fraction"). The mixture produced was stirred for 0.5 hour.

39.2 cm$^3$ of carbon tetrachloride were then added to the mixture and stirring was continued for a further 0.5 hour.

12.5 cm$^3$ of titanium tetrachloride were finally added and the reaction mixture was stirred for one hour.

The supernatant liquid was filtered off and the solid resuspended in 0.8 liters of the aliphatic hydrocarbon fraction. The mixture was stirred for about 8 minutes and the supernatant liquid was filtered off. The step of resuspending and filtering was carried out a total of four times. The solid was finally suspended in 1.6 liters of the aliphatic hydrocarbon fraction (hereafter referred to as "suspension A").

In the foregoing procedure, for each gramme of mica there was used 0.076 millimole of magnesium dibutyl; 0.81 millimole of carbon tetrachloride; and 0.228 millimole of titanium tetrachloride.

(b) Preparation of Mica-Polymer Composition

Into a five liter jacketted reaction vessel provided with a stirrer, were introduced, under an atmosphere of nitrogen, two liters of the aliphatic hydrocarbon fraction. The liquid was heated up to 60° C. whilst being stirred and all of suspension A was added.

The flask was evacuated and the vacuum was released with nitrogen. This procedure was repeated twice more and the flask was evacuated once more. Hydrogen was then added to raise the pressure to 0.53 kg/cm$^2$ absolute. Ethylene was then added to saturate the aliphatic hydrocarbon fraction at atmospheric pressure (1.05 kg/cm$^2$) and 60° C. 50 millimole of aluminium triethyl were then introduced, the pressure was raised to 2.11 kg/cm$^2$ gauge by the addition of more ethylene and the pressure was maintained at 2.11 kg/cm$^2$ gauge by continuously charging ethylene into the reaction vessel.

The amount of ethylene was monitored and polymerisation was continued until about 500 g of ethylene had been added after attaining the pressure of 2.11 kg/cm$^2$ gauge. During the course of the polymerisation, a temperature rise was observed. After sufficient ethylene had been added (which took about 40 minutes), the polymerisation vessel was vented and purged with nitrogen. The suspension was transferred to a filtration vessel and filtered. The solid was removed from the filtration vessel and dried (in vacuo) at 80° C. for four hours. A total of 950 grammes of a free flowing product was obtained.

A known weight of a sample of the product was heated over a flame in air at about 600° C. for about 15 minutes and the residue was cooled in a dessicator and reweighed. From this, the ash content (essentially all mica) of the product was found to be 52.4% by weight.

EXAMPLES 2 TO 7

The procedure of Example 1 was repeated with the following variations.

The mica used was "Suzorite" Grade 200HK.

The amount of magnesium dibutyl solution was varied to provide different quantities of magnesium dibutyl per gramme of mica.

In the polymerisation, different amounts of hydrogen were used but the amount of ethylene was essentially the same in each polymerisation.

Further details, and some properties of the products, are given in Table One.

TABLE One

| Example | Amount MgBu$_2$ (mM/g) (a) | H$_2$ amount (kg/cm$^2$) (b) | Wt % Ash | Packing Density (g/cm$^3$) (c) | Median Particle size (μm) (d) |
|---|---|---|---|---|---|
| 2 | 0.125 | Nil | 43.1 | 0.206 | 305 |
| 3 | 0.125 | 1.05 | 48.2 | 0.222 | 231 |
| 4 | 0.031 | 1.05 | 50.7 | 0.263 | 152 |
| 5 | 0.076 | 1.05 | 55.8 | 0.256 | 161 |
| 6 | 0.076 | Nil | 51.5 | 0.247 | 182 |
| 7 | 0.076 | 0.53 | 53.3 | 0.286 | ND |

Notes to Table One
(a) Millimoles of magnesium dibutyl added for each gramme of mica.
(b) Pressure to which hydrogen charged before starting polymerisation.
(c) Determined by introducing 10 grammes of the polyethylene/mica composition into a 50 cm$^3$ flatbottomed graduated tube of 2 cm internal diameter. The particles of the composition were competed by striking the base of the tube against a horizontal surface a total of 30 times. The volume occupied by the particles was then determined. Duplicate measurements were made.
(d) Median particle size is determined by sieving a sample of the composition, weighing each sieve fraction, plotting the weight percent of particles oversize against particle size (in micrometers), and from this plot determining the particle size corresponding to 50% by weight of the material being oversize.
ND means Not Determined.

EXAMPLES 8 TO 12

The procedure of Example 1 was repeated using either "Suzorite" Grade 60 HK or Grade 150 C mica and various quantities of hydrogen.

Further details, and some properties of the products, are given in Table Two, which includes the results of Example 1.

TABLE Two

| Example | Mica Grade | H$_2$ amount kg/cm$^2$ (b) | Wt % Ash | Packing Density (g/cm$^3$) (c) | Median Particle size (μm) (d) |
|---|---|---|---|---|---|
| 8 | 60 HK | Nil | 48.8 | 0.23 | 307 |
| 9 | 60 HK | 0.53 | 52.1 | 0.225 | ND |
| 10 | 60 HK | 1.05 | 49.4 | 0.233 | ND |
| 11 | 150 C | Nil | 47.6 | 0.217 | 291 |
| 12 | 150 C | 1.05 | 47.7 | 0.18 | ND |
| 1 | 150 C | 0.53 | 52.4 | 0.217 | ND |

Notes to Table Two (b) (c) and (d) are as defined in Notes to Table One.

EXAMPLES 13 AND 14

The procedure of Example 1 was repeated using a different grade of mica ("Suzorite" Grade 200HK) and different amounts of hydrogen were charged initially. An appropriate smaller quantity of ethylene was introduced into the polymerisation vessel in order to obtain a higher proportion of mica in the mica/polyethylene composition obtained. The results obtained are set out in Table Three.

TABLE Three

| Example | H$_2$ (amount kg/cm2) (b) | Wt % Ash |
|---|---|---|
| 13 | Nil | 63 |
| 14 | 0.53 | 70 |

Notes to Table Three
(b) is as defined in Notes to Table One.

EXAMPLES 15 TO 26

The procedure of Example 1 was repeated on a smaller scale using 20 grammes of "Suzorite" Grade 200 HK mica and the other reactants in various proportions. Parts (a) and (b) of the procedure were both carried out in the same reaction vessel, which was a one liter vessel. 200 cm$^3$ of the aliphatic hydrocarbon fraction were used and the temperature was maintained at 60° C. through all stages of the procedure. The reactants (magnesium dibutyl, carbon tetrachloride and titanium tetrachloride) were added in turn to the contents of the reaction vessel.

The contents of the flask were stirred for varying periods of time after the addition of the reactants.

When all of the reactants had been added, ethylene was added to saturate the mixture at 60° C. and atmospheric pressure. No filtration and washing of the reaction mixture was effected before adding the ethylene. No hydrogen was added to the system. 8 millimoles of aluminium triethyl were then introduced and polymerisation was effected by the addition of ethylene to maintain the pressure at atmospheric pressure. Polymerisation was continued until 20 grammes of ethylene had been introduced after the addition of aluminium triethyl. Further details of the quantities of reactants used, the stirring times and the nature of the product obtained are set out in Table Four.

TABLE FOUR

| | MgBu$_2$ | | CCl$_4$ | | TiCl$_4$ | | |
|---|---|---|---|---|---|---|---|
| Example | Amount (mM/g) (a) | Time (hrs) (e) | Amount (mM/g) (f) | Time (hrs) (e) | Amount (mM/g) (h) | Time (hrs) (e) | Product Form |
| 15 | 0.1 | 0.5 | 0.1 | 0.5 | 0.1 | 1.0 | Fine, slightly fibrous |
| 16 | 0.1 | 0.5 | 0.1 | 0.5 | 0.025 | 0.75 | Fibrous |
| 17 | 0.1 | 0.5 | 0.1 | 0.5 | 0.0125 | 0.75 | Poor coverage; slow polymerisation |
| 18 | 0.1 | 0.5 | 0.1 | 0.25 | 0.02 | 0.5 | Fibrous |
| 19 | 0.1 | 0.5 | 0.05 | 0.25 | 0.025 | 0.5 | Particulate; free polymer present |
| 20 | 0.1 | 0.25 | 0.05 | 0.25 | 0.02 | 0.5 | Particulate |
| 21 | 0.07 | 0.25 | 0.05 | 0.25 | 0.02 | 0.25 | Particulate |
| 22 | 0.07 | 0.25 | 0.035 | 0.25 | 0.014 | 0.25 | Fibrous |
| 23 | 0.07 | 0.25 | 0.035 | 0.25 | 0.02 | 0.25 | Fibrous |
| 24 | 0.07 | Nil | 0.05 | Nil | 0.02 | Nil | Particulate |
| 25 | 0.07 | 0.25 | 0.05 | 0.25 | 0.04 | 0.25 | Particulate, few fibres |

TABLE FOUR-continued

| Example | MgBu$_2$ Amount (mM/g) (a) | MgBu$_2$ Time (hrs) (e) | CCl$_4$ Amount (mM/g) (f) | CCl$_4$ Time (hrs) (e) | TiCl$_4$ Amount (mM/g) (h) | TiCl$_4$ Time (hrs) (e) | Product Form |
|---|---|---|---|---|---|---|---|
| 26 | 0.05 | 0.25 | 0.03 | 0.25 | 0.02 | Nil | |

Notes to Table Four
(a) Is as defined in Notes to Table One.
(e) Hours stirring time before adding next reactant.
(f) Millimoles of carbon tetrachloride added for each gramme of mica.
(h) Millimoles of titanium tetrachloride added for each gramme of mica.

EXAMPLES 27 TO 29

The procedure of Example 21 was repeated using 500 grammes of mica and 3.6 liters of the aliphatic hydrocarbon fraction in a five liter vessel as described in part (b) of Example 1. The reactants were used in the same proportions relative to the mica as in Example 21 and ethylene was polymerised using 50 millimoles of aluminium triethyl, no hydrogen and a total pressure of 2.11 kg/cm$^2$ gauge. About 500 g of ethylene were added to the reaction vessel. A different type of mica was used in each preparation. Further details are given in Table Five.

TABLE Five

| Example | Mica Grade | Wt % |
|---|---|---|
| 27 | 200 HK | 42 |
| 28 | 150 C | 51 |
| 29 | 60 HK | 54 |

EXAMPLES 30 TO 33

3.3 grammes of magnesium turnings (BDH "Grignard" Grade), 20.8 cm$^3$ of di-n-butyl ether, 13.1 cm$^3$ of n-butylchloride and a small crystal of iodine were added to 100 cm$^3$ of n-heptane. The mixture was refluxed for two hours. The supernatant liquid, which contained a n-butyl magnesium chloride material was used in the manner described hereafter.

The procedure broadly described for Examples 15 to 26 was repeated with the exception that the dibutyl magnesium and carbon tetrachloride were replaced by the supernatant liquid containing the n-butyl magnesium chloride material, the preparation of which is hereinbefore described. Further details of the conditions used, and the type of product obtained, are set out in Table Six.

TABLE Six

| Example | BuMgCl Amount (mM/g) (i) | BuMgCl Time (hrs) | TiCl$_4$ Amount (mM/g) (h) | TiCl$_4$ Type (hrs) (e) | Product |
|---|---|---|---|---|---|
| 30 | 0.07 | 0.25 | 0.02 | 0.25 | Particulate |
| 31 | 0.01 | 0.25 | 0.05 | 0.25 | Particulate |
| 32 | 0.15 | 0.25 | 0.02 | 0.25 | Fibrous |
| 33 | 0.15 | 0.25 | 0.01 | 0.25 | Fibrous |

Notes to Table Six
(e) and (h) are both as defined in Notes to Table Four.
(i) Millimoles of n-butyl magnesium chloride added for each gramme of mica.

EXAMPLES 34 TO 37

The general procedure of Examples 15 to 26 was repeated using different filler materials in place of mica and various quantities of the reactants. 15 minutes stirring time was allowed between the addition of the various reactants. Further details are given in Table Seven.

TABLE Seven

| Example | Filler type (j) | MgBu$_2$ (mM/g) (k) | CCl$_4$ (mM/g) (l) | TiCl$_4$ (mM/g) (m) |
|---|---|---|---|---|
| 34 | Vermiculite | 0.1 | 0.07 | 0.02 |
| 35 | Talc | 0.1 | 0.07 | 0.02 |
| 36 | Carbon Black Regal 300 | 0.07 | 0.05 | 0.02 |
| 37 | Fibreglass FGCS 1640 | 0.07 | 0.05 | 0.02 |

Notes to Table Seven
(j) The vermiculite was a delaminated and dried material produced by the process of European Patent Application Publication No. 0 009 311. The talc was Garotalc 132 obtained from Plastichem Limited, Esher, Surrey, England. The carbon black was obtained from Cabot Carbon Limited, Stanlow, Ellesmere Port, South Wirral, England. The fibreglass was of 3 mm chopped strand length and was obtained from Fibreglass Limited, St Helens, Merseyside, England.
(k) Millimoles of dibutyl magnesium added for each gramme of filler.
(l) Millimoles of carbon tetrachloride added for each gramme of filler.
(m) Millimoles of titanium tetrachloride added for each gramme of filler.

EXAMPLE 38

(a) Preparation of Mica-Transition Metal Composition

Into a one liter vessel having a sintered base and provided with a stirrer were placed 200 cm$^3$ of n-heptane. 40 grammes of mica ("Suzorite" Grade 200 HK) were added and the mixture was stirred without heating.

To the stirred mixture was added a quantity of the solution of magnesium dibutyl used in Example 1, in an amount sufficient to provide one millimole of magnesium dibutyl for each gramme of mica. The mixture was stirred at ambient temperature of 0.5 hours.

50 cm$^3$ of carbon tetrachloride were then added and stirring was continued for a further two hours. Stirring was stopped and the mixture was filtered. The solid was resuspended in 100 cm$^3$ of n-heptane, stirred for about 10 minutes and the mixture was filtered. The procedure of resuspending and filtering was repeated twice more.

The solid was suspended in a solution of 4.6 cm$^3$ of ethylbenzoate in 100 cm$^3$ of n-heptane and the mixture was stirred overnight at ambient temperature. Stirring was stopped and the mixture was filtered. The solid was washed three times by suspending in 100 cm$^3$ of n-heptane and filtering as described above.

The solid was suspended in 50 cm$^3$ of titanium tetrachloride and 50 cm$^3$ of n-heptane, the mixture was stirred and heated up to 80° C. The temperature of 80° C. was maintained for two hours whilst continuing to stir. Stirring and heating were terminated and the mixture was filtered whilst still hot. The solid was washed three times by suspending in 100 cm$^3$ of n-heptane at 80° C. and filtering as described above. The solid was finally suspended in 100 cm$^3$ of the aliphatic hydrocarbon fraction.

(b) Preparation of Mica-Polypropylene Composition

Into a one liter jacketted reaction vessel provided with a stirrer and containing 400 cm$^3$ of the aliphatic hydrocarbon fraction, was introduced, under nitrogen, all of the suspension obtained in part (a). The mixture was heated up to 60° C. whilst being stirred. The flask was evacuated and the vacuum was released with nitrogen. This procedure was repeated twice more and the flask was finally evacuated once more. Propylene was added to saturate the aliphatic hydrocarbon fraction at 60° C. and atmospheric pressure. 1.5 millimoles of ethyl anisate were then added, followed by 8 millimoles of triethyl aluminium, both materials being added as solutions in the aliphatic hydrocarbon fraction.

Propylene was then monitored into the flask until about 40 grammes of propylene had been added after the addition of the aluminium triethyl. The product was recovered, and the ash content determined, as described in Example 1. A weighed sample of the polymerisation diluent was evaporated to dryness to determine the weight of polymer dissolved in the diluent. From these determinations, the proportion of polypropylene dissolved in the polymerisation diluent was calculated to be 2.8% by weight of the total polypropylene produced.

EXAMPLE 39

A mica-transition metal composition was prepared as described in part (a) of Example 38 and this was used to prepare a mica-polypropylene composition. The procedure used was as described in part (b) of Example 38 with the exception that 2.0 millimoles of ethyl anisate were used. The proportion of polypropylene dissolved in the polymerisation diluent was calculated to be 2.5% by weight.

EXAMPLE 40

The procedure of part (a) of Example 38 was repeated with the exception that the magnesium dibutyl was used in an amount of 0.5 millimole per gramme of mica, the mixture was stirred with carbon tetrachloride for one hour and the treatment with titanium tetrachloride was effected using a mixture of 30 cm$^3$ of titanium tetrachloride and 60 cm$^3$ of n-heptane. The product obtained was used to polymerise propylene under the conditions of part (b) of Example 38. The proportion of polypropylene dissolved in the polymerisation diluent was calculated to be 3.0% by weight.

EXAMPLE 41

The procedure of Example 40 was repeated with the exception that polymerisation was effected using 2.0 millimoles of ethyl anisate. The proportion of polypropylene dissolved in the polymerisation diluent was calculated to be 2.8% by weight.

EXAMPLE 42

The procedure of part (a) of Example 38 was repeated with the exception that the treatment with carbon tetrachloride was replaced by a treatment with silicon tetrachloride, and the mixture containing silicon tetrachloride was heated to 80° C. and maintained at that temperature for two hours. The product obtained was used to polymerise propylene under the conditions of part (b) of Example 38. The proportion of polypropylene dissolved in the polymerisation diluent was calculated to be 5.8% by weight.

EXAMPLE 43

The procedure of Example 42 was repeated with the exception that polymerisation was effected using 2.0 millimoles of ethyl anisate. The proportion of polypropylene dissolved in the polymerisation diluent was calculated to be 6.1% by weight.

EXAMPLE 44

A solution containing an n-butyl magnesium chloride material was prepared by the procedure described in Examples 30 to 33.

The process of Examples 27 to 29 was repeated using 500 grammes of "Suzorite" Grade 150 C mica and replacing the magnesium dibutyl solution and the carbon tetrachloride by the solution of the n-butyl magnesium chloride material in a quantity sufficient to provide 35 millimoles of n-butyl magnesium chloride. After stirring the mixture for 15 minutes, 10 millimoles of titanium tetrachloride were added as a 0.912 molar solution of titanium tetrachloride in the aliphatic hydrocarbon fraction. After stirring for a further 20 minutes, ethylene was added to saturate the mixture at 60° C. and atmospheric pressure and 50 cm$^3$ of a 1.59 molar solution of aluminium triethyl in the aliphatic hydrocarbon fraction was then added. Ethylene was then added to raise the pressure to 3.1 kg/cm$^2$ gauge. Ethylene was added regularly over a period of one hour when about 500 grammes of ethylene had been added. During the addition of the ethylene, both the temperature and pressure rose.

At the end of the polymerisation, the solid product was recovered in the manner described in step (b) of Example 1.

EXAMPLE 45

Into a one liter vessel provided with a stirrer and a sinter base were placed 20 grammes of "Suzorite" Grade 150 C mica and 100 cm$^3$ of n-heptane. The mixture was stirred and the magnesium dibutyl solution was added in a sufficient quantity to provide 1.4 millimoles of magnesium dibutyl. The mixture was stirred for 15 minutes and one cm$^3$ of a solution of carbon tetrachloride in the aliphatic hydrocarbon fraction, containing 1 millimole of carbon tetrachloride, were then added and stirring was continued for a further 15 minutes.

The liquid was filtered off, and the vessel was then evacuated to evaporate off the residual n-heptane and other volatile materials at ambient temperature.

A 1:1 complex of titanium tetrachloride and ethyl benzoate was placed in the vessel below the sinter base. The vessel was evacuated to less than 0.1 mm of mercury and sealed. The lower portion of the vessel was then placed in an oil bath maintained at 100° C. which caused the complex to sublime and a yellow solid was observed to condense in the upper portion of the reaction vessel. After two hours the vessel was removed from the oil bath and nitrogen was introduced to raise the pressure to atmospheric pressure.

200 cm$^3$ of the aliphatic hydrocarbon fraction was added and the mixture was transferred to a one liter polymerisation vessel. The mixture was stirred and heated up to 60° C. The aliphatic hydrocarbon fraction was saturated with ethylene at 60° C. and atmospheric pressure. Eight millimoles of aluminium triethyl were then added and ethylene was introduced to maintain the pressure at atmospheric pressure. Polymerisation was continued by the addition of ethylene until about 20 grammes of ethylene had been added. Polymerisation was then terminated and the product recovered in the manner described in Example 1.

EXAMPLE 46

The general procedure of Examples 27 to 29 was repeated using "Suzorite" Grade 150 C mica but only 5 millimoles of carbon tetrachloride. Polymerisation was effected using 80 millimoles of aluminium triethyl.

EXAMPLE 47

The procedure of Example 46 was repeated with the exception that 10 millimoles of carbon tetrachloride were used.

EXAMPLE 48

The procedure of Example 46 was repeated with the exception that 15 millimoles of carbon tetrachloride were used.

EXAMPLE 49

The procedure of Example 46 was repeated with the exception that 20 millimoles of carbon tetrachloride were used.

EXAMPLE 50

The general procedure of Examples 27 to 29 was repeated on a larger scale using a stainless steel autoclave fitted with a stirrer and having a total volume of 143 liters.

Into the autoclave were placed 90 liters of the aliphatic hydrocarbon fraction which were heated to 60° C. and 7 kg of "Suzorite" Grade 150 C mica were added. The mixture was stirred and stirring was continued throughout all of the following procedures. The autoclave was evacuated to a pressure of 50 mm of mercury and maintained at this reduced pressure for 30 minutes. The vacuum was then released by the addition of nitrogen.

830 cm$^3$ of a 0.59 molar solution of magnesium dibutyl in the isoparaffin fraction were then added followed by one liter of the aliphatic hydrocarbon fraction. The mixture was stirred for 15 minutes.

20.3 cm$^3$ of carbon tetrachloride were then added followed by one liter of the aliphatic hydrocarbon fraction. The mixture was stirred for 15 minutes.

140 cm$^3$ of a molar solution of titanium tetrachloride in the aliphatic hydrocarbon fraction were added followed by one liter of the aliphatic hydrocarbon. The mixture was stirred for 50 minutes.

A 1.59 molar solution of aluminium triethyl in the aliphatic hydrocarbon fraction was added in a quantity sufficient to provide one mole of aluminium triethyl.

Ethylene was then passed into the autoclave at a steady rate equivalent to 5 kg of ethylene per hour. After an hour the autoclave was vented, evacuated to a pressure of 50 mm of mercury and then nitrogen was introduced to atmospheric pressure. The suspension was then transferred to a 143 liter filtration vessel and filtered.

The autoclave was washed with 35 liters of the aliphatic hydrocarbon fraction, the liquid was transferred to the filtration vessel and filtered through th solid. The autoclave was washed with 20 liters of n-heptane, the n-heptane was transferred to the filtration vessel and filtered through the solid. The solid was partially dried by a flow of air at ambient temperature for two days. Drying of the solid was completed in a vacuum oven at 80° C. for six hours.

EXAMPLE 51

A further sample of a polyethylene-mica composition was obtained by repeating the procedure of Example 50.

Heterogeneity determinations

A sample (between 20 and 30 grammes) of the product of each of Examples 45 to 51 was sieved. The ash contents of the sieve fractions were determined using the procedure described at the end of stage (b) of Example 1.

Sieving was effected using a stack of sieves from 850 micron mesh (top sieve) to 53 micron mesh (bottom sieve), with a pan beneath the bottom sieve and a cover on the top sieve. The sample was placed in the top sieve, the cover was placed on, the stack was held in a clamp and the whole assembly was placed in a mechanical shaking device. Shaking was carried for one hour and then the assembly of sieves was separated. The solid retained by each sieve was weighed and the ash content of each sieve fraction was determined.

The results are set out in Tables Eight to Fourteen, together with total ash content and the heterogeneity.

TABLE Eight

Sieve Analysis of Product of Example 45

| Sieve mesh size (μm) | Retained Material (Wt grammes) | % of total | Wt % of Ash |
|---|---|---|---|
| 850 | Nil | — | — |
| 710 | 0.2 | 0.8 | ND |
| 500 | 4.8 | 19.9 | 48.3 |
| 425 | 5.3 | 22.0 | 49.3 |
| 300 | 10.3 | 42.7 | 48.7 |
| 250 | 2.2 | 9.1 | 48.3 |
| 212 | 0.5 | 2.0 | 46.4 |
| 150 | 0.6 | 2.5 | 48.9 |
| 110 | 0.2 | 0.8 | ND |
| 53 | Nil | — | — |
| Pan | Nil | — | — |

TABLE Nine

Sieve Analysis of Product of Example 46

| Sieve mesh size (μm) | Retained Material (Wt grammes) | % of total | Wt % of Ash |
|---|---|---|---|
| 850 | Nil | — | — |
| 710 | Nil | — | — |
| 500 | Nil | — | — |
| 425 | Nil | — | — |
| 300 | 0.6 | 2.0 | 53.5 |
| 250 | 5.4 | 17.7 | 59.8 |
| 212 | 5.0 | 16.4 | 57.9 |
| 150 | 11.0 | 36.0 | 56.5 |
| 110 | 5.6 | 18.4 | 50.4 |
| 53 | 2.4 | 7.8 | 44.6 |
| Pan | 0.5 | 1.7 | 27.8 |

TABLE Ten

Sieve Analysis of Product of Example 47

| Sieve mesh size (μm) | Retained Material (Wt grammes) | % of total | Wt % of Ash |
|---|---|---|---|
| 850 | Nil | — | — |
| 710 | Nil | — | — |
| 500 | Nil | — | — |
| 425 | Nil | — | — |
| 300 | 3.9 | 14.9 | 47.4 |

TABLE Ten-continued

Sieve Analysis of Product of Example 47

| Sieve mesh size (μm) | Retained Material (Wt grammes) | % of total | Wt % of Ash |
|---|---|---|---|
| 250 | 10.0 | 38.2 | 48.6 |
| 212 | 4.4 | 16.8 | 48.2 |
| 150 | 5.3 | 20.2 | 47.3 |
| 110 | 1.9 | 7.3 | 45.0 |
| 53 | 0.5 | 2.0 | 35.8 |
| Pan | 0.2 | 0.7 | 17.2 |

TABLE Eleven

Sieve Analysis of Product of Example 48

| Sieve mesh size (μm) | Retained Material (Wt grammes) | % of total | Wt % of Ash |
|---|---|---|---|
| 850 | Nil | — | — |
| 710 | Nil | — | — |
| 500 | Nil | — | — |
| 425 | Nil | — | — |
| 300 | 2.37 | 8.2 | 43.7 |
| 250 | 9.92 | 34.2 | 59.9 |
| 212 | 5.41 | 18.6 | 61.1 |
| 150 | 7.95 | 27.4 | 59.2 |
| 110 | 2.59 | 8.9 | 57.3 |
| 53 | 0.69 | 2.4 | 51.2 |
| Pan | 0.10 | 0.4 | 33.5 |

TABLE Twelve

Sieve Analysis of Product of Example 49

| Sieve mesh size (μm) | Retained Material (Wt grammes) | % of total | Wt % of Ash |
|---|---|---|---|
| 850 | Nil | — | — |
| 710 | Nil | — | — |
| 500 | Nil | — | — |
| 425 | Nil | — | — |
| 300 | 2.6 | 10.5 | 51.4 |
| 250 | 8.14 | 32.8 | 52.8 |
| 212 | 4.69 | 18.9 | 53.0 |
| 150 | 6.40 | 25.8 | 51.4 |
| 110 | 2.35 | 9.5 | 48.4 |
| 53 | 0.56 | 2.26 | 44.6 |
| Pan | 0.04 | 0.16 | ND |

TABLE Thirteen

Sieve Analysis of Product of Example 50

| Sieve mesh size (μm) | Retained Material (Wt grammes) | % of total | Wt % of Ash |
|---|---|---|---|
| 850 | 0.10 | 0.33 | 24.7 |
| 710 | 0.10 | 0.33 | 57.9 |
| 500 | 0.10 | 0.33 | 60.7 |
| 425 | 2.28 | 7.50 | 63.1 |
| 300 | 18.35 | 60.62 | 63.1 |
| 250 | 5.05 | 16.68 | 62.0 |
| 212 | 1.74 | 5.74 | 60.6 |
| 150 | 1.47 | 4.86 | 53.3 |
| 106 | 0.82 | 2.7 | 80.8 |
| 53 | 0.16 | 0.53 | ND |
| Pan | 0.10 | 0.33 | ND |

TABLE Fourteen

Sieve Analysis of Product of Example 51

| Sieve mesh size (μm) | Retained Material (Wt grammes) | % of total | Wt % of Ash |
|---|---|---|---|
| 850 | 0.05 | 0.16 | 32.1 |
| 710 | 0.10 | 0.32 | ND |
| 500 | 0.30 | 1.00 | ND |
| 425 | 2.00 | 6.4 | 56.7 |
| 300 | 18.60 | 60.4 | 58.2 |
| 250 | 5.20 | 16.9 | 57.1 |
| 212 | 1.90 | 6.1 | 54.7 |
| 150 | 1.80 | 5.8 | 56.3 |
| 106 | 0.80 | 2.6 | 68.6 |
| 53 | 0.03 | 0.13 | 54.8 |
| Pan | 0.01 | 0.03 | ND |

The proportion of low heterogeneity, and the degree of heterogeneity, of the products of Examples 45 to 51 are set out in Table Fifteen.

TABLE Fifteen

| Product | Proportion (Wt %) | Heterogeneity (%) |
|---|---|---|
| 45 | 98.2 | 2.9 |
| 45 | 93.7 | 1.0 |
| 46 | 90.5 | 9.4 |
| 47 | 97.3 | 3.6 |
| 47 | 90.0 | 1.3 |
| 48 | 91.4 | 9.9 |
| 49 | 99.76 | 8.4 |
| 49 | 97.5 | 4.6 |
| 50 | 96.06 | 9.8 |
| 50 | 90.87 | 3.0 |
| 51 | 95.6 | 3.5 |

EXAMPLES 52 TO 59

The general procedure of Example 50 was repeated with variations. The quantity of the mica used in all examples was 3 kg. In all examples the amount of magnesium dibutyl was 0.07 millimoles per gramme of mica and the amount of titanium tetrachloride was 0.02 millimoles per gramme of mica. After adding the aluminium triethyl, the mixture was stirred for 0.2 hours before ethylene was introduced into the autoclave. Ethylene was passed into the autoclave at a steady rate equivalent to two kg of ethylene per hour and polymerisation was continued for an hour. Other conditions were varied and the details of these variations are set out in Table Sixteen.

TABLE Sixteen

| Example | MgBu$_2$ Time (hrs) (e) | CCl$_4$ Amount (mM/g) (f) | CCl$_4$ Time (hrs) (e) | TiCl$_4$ Time (hrs) (e) | TEA Amount (mM) (n) | Polyn Temp (°C.) | Diluent Vol (dm$^3$) |
|---|---|---|---|---|---|---|---|
| 52 | 0.5 | 0.03 | 0.5 | 1.0 | 450 | 60 | 75 |
| 53 | 1.0 | 0.03 | 1.0 | 1.0 | 450 | 60 | 75 |
| 54 | 0.5 | 0.04 | 0.5 | 1.0 | 450 | 60 | 75 |
| 55 | 0.5 | 0.05 | 0.5 | 1.0 | 450 | 60 | 75 |
| 56 | 0.5 | 0.03 | 0.5 | 1.0 | 450 | 60 | 75 |
| 57 | 0.5 | 0.03 | 0.5 | 1.0 | 450 | 75 | 75 |

TABLE Sixteen-continued

| | MgBu$_2$ | CCl$_4$ | | TiCl$_4$ | TEA | | |
| | Time (hrs) | Amount (mM/g) | Time (hrs) | Time (hrs) | Amount (mM) | Polyn Temp | Diluent Vol |
| Example | (e) | (f) | (e) | (e) | (n) | (°C.) | (dm$^3$) |
| --- | --- | --- | --- | --- | --- | --- | --- |
| 58 | 0.5 | 0.03 | 0.5 | 1.0 | 600 | 85 | 50 |
| 59 | 0.25 | 0.03 | 0.25 | 0.5 | 600 | 85 | 50 |

Notes to Table Sixteen
(e) and (f) are as defined in Notes to Table Four.
(n) Total amount, in millimoles, of aluminum triethyl.

Some of the properties of the products obtained were determined and these are set out in Table Seventeen.

TABLE Seventeen

| | Wt % | Mean Particle Size (o) | Flow Properties (kg/cm$^2$) (p) | |
| Example | Ash | (microns) | P(S1) | P(S4) |
| --- | --- | --- | --- | --- |
| 52 | 60 | 339 | 86.5 | 110 |
| 53 | 85 | 248 | 382 | 431 |
| 54 | 63.5 | 292 | 83 | 104 |
| 55 | 61.5 | 352 | 100 | 119 |
| 56 | 62 | 339 | 94 | 114 |
| 57 | 64 | 300 | 98.5 | 122.5 |
| 58 | 64.5 | 364 | 77.5 | 94 |
| 59 | 56 | 274 | 35 | 60 |

Notes to Table Seventeen
(o) Mean Particle Size was determined by sieving, weighing each sieve fraction to determine the weight fraction retained by each sieve, obtaining a product of weight fraction and sieve size and finding the sum of these products, the sum being the Mean Particle Size.
(p) Flow Properties were determined using a Davenport Capillary Rheometer having an internal bore of 19 mm diameter and a die of 2 mm diameter. The main barrel was heated by an external electrical heating coil wrapped around the barrel. A pressure transducer was located in the barrel wall above the die entry to measure the pressure during extrusion. The rheometer was provided with a motor driven ram which could be adjusted to cause the ram to travel at a selected constant rate (that is at a constant stress). The bore of the barrel was pre-heated to 170° C. and filled with the polyolefine composition to be tested. The ram was driven down to pack the composition. The system was allowed to stand for 15 minutes and the ram was then driven to cause the appearance of an extrudate. The ram speed was then selected to give a shear rate (S1) of 13 sec$^{-1}$ and the constant pressure reading from the transducer was noted as P(S1). The ram speed was increased to give a shear rate (S4) of 52 sec$^{-1}$ and the constant pressure reading from the transducer was noted as P(S4).

EXAMPLES 60–62

The procedure of Examples 27 to 29 was repeated with variations. The quantity of the mica used in all examples was 500 grammes and the quantity of the aliphatic hydrocarbon fraction was 3.5 liters. The type of mica, the proportion of carbon tetrachloride, and the stirring time after the addition of titanium tetrachloride, were varied. Polymerisation was effected at a total pressure of 1.4 kg/cm$^2$ gauge for varying times after introducing the ethylene. 80 millimoles of aluminium triethyl was used for each polymerisation. Further details are given in Table Eighteen.

TABLE Eighteen

| Example | Mica Grade | CCl4 Amount (mM/g) (f) | TiCl4 Time (hrs) (e) | Polyn Time (mins) (q) |
| --- | --- | --- | --- | --- |
| 60 | 150C | 0.03 | 0.5 | 27 |
| 61 | 60HK | 0.03 | 1.75 | 34 |
| 62 | 150C | 0.01 | 0.42 | 66 |

Notes to Table Eighteen
(e) and (f) are both as defined in Tables to Table Four.
(q) Time is measured from the time of adding the ethylene and aluminium triethyl.

Some of the properties of the products obtained were determined and these are set out in Table Nineteen.

TABLE Nineteen

| | Wt % | Flow Properties(kg/cm$^2$) (p) | |
| Example | Ash | P(S1) | P(S4) |
| --- | --- | --- | --- |
| 60 | 54 | 42.5 | 61.5 |
| 61 | 57 | 43 | 62 |
| 62 | 60 | 52 | 72 |

Notes to Table Nineteen
(p) is as defined in Notes to Table Seventeen.

EXAMPLE 63

The procedure as generally described for Examples 15 to 26 was repeated to prepare a mica-polypropylene composition, the detailed conditions being as given hereafter.

A vessel of capacity two liters and one liter of the aliphatic hydrocarbon fraction were used. 20 grammes of mica ("Suzorite" Grade 150C) were added followed, in turn, by the magnesium dibutyl solution (to provide 8.8 millimoles of magnesium dibutyl), boron trichloride (to provide 10 millimoles of boron trichloride), ethyl benzoate (to provide one millimole of ethyl benzoate) and titanium tetrachloride (to provide one millimole of titanium tetrachloride). The mixture was stirred throughout and a period of 15 minutes stirring was effected before adding the next reagent.

After adding the titanium tetrachloride, the mixture was stirred for 15 minutes and a mixture of 24 millimoles of aluminium triethyl and 9 millimoles of ethyl-4-methylbenzoate was then added. Propylene was added to saturate the aliphatic hydrocarbon fraction at 60° C. and the addition of propylene was continued to maintain the pressure at atmospheric pressure. Further 12 millimole portions of aluminium triethyl were added after 8 and 40 minutes polymerisation. Polymerisation was continued for a total of 1.4 hours and was then terminated, and the product recovered, as described in Example 1. The product contained 76% of mica and the proportion of polypropylene dissolved in the polymerisation diluent was 4% by weight.

EXAMPLE 64

The procedure of Example 1 was repeated on a smaller scale using 30 grammes of "Suzorite" Grade 150C mica and the other reactants in various proportions. The carbon tetrachloride was replaced by ethyl aluminium dichloride. Parts (a) and (b) of the procedure were both carried out in the same reaction vessel, which was a two liter vessel. One liter of the aliphatic hydrocarbon fraction was used and the temperature was maintained at 60° C. through all stages of the procedure. Before the reactants were added, the vessel was three times evacuated and purged with nitrogen and finally evacuated and ethylene was added to saturate the mixture at 60° C. and 1.15 kg/cm$^2$ pressure. The reactants were then added in turn to the contents of the reaction vessel with five minutes stirring after the addition of each reactant.

No filtration and washing of the reaction mixture was effected and no hydrogen was added to the system. After stirring the mixture for 15 minutes, 10 millimoles of aluminium triethyl were introduced and polymerisation was effected by the addition of ethylene to maintain the pressure at atmospheric pressure. Polymerisation was continued for 13 minutes and then terminated as in Example 1.

A further series of experiments was carried out (Comparative Examples A to C) using a similar procedure but varying the order of addition of the reagents to the mica, or omitting one of the reagents. In all cases the systems were found to be essentially inactive even though polymerisation conditions were maintained for at least 45 minutes. Further details of the procedures used are set out in Table Twenty.

TABLE Twenty

| Example or Comp. Example | Reagents Added (q) | | | Product Wt % Ash (r) |
|---|---|---|---|---|
| | First | Second | Third | |
| 64 | MB(2.1) | EADC(3.0) | TTC(0.6) | 38 |
| A | EADC(3.0) | MB(2.1) | TTC(0.6) | NP |
| B | TTC(0.6) | EADC(3.0) | MB(2.1) | NP |
| C | EADC(3.0) | TTC(0.6) | Nil | NP |

Notes to Table Twenty
(q) The numbers in brackets indicate the amount, in millimoles, of each reagent added.
MB is magnesium dibutyl
EADC is ethyl aluminium dichloride
TTC is titanium tetrachloride
NIL indicates that no third reagent was used
(r) NP indicates no product obtained since the system showed very low polymerisation activity.

I claim:

1. A process for the production of a polyolefine composition which is a composite material comprising an olefine polymer and a filler material wherein the filler material is graphite, carbon black, an aluminosilicate clay, mica, talc, vermiculite or glass-fibre forms from 10 up to 90% by weight of the composition, such process comprising the steps of
   (1) treating the filler material with (a) an organic magnesium halide compound, or (b) an organic magnesium compound followed by a halogen-containing compound wherein the amount of the organic magnesium compound used in (a) or (b) does not exceed 20 times the amount required to saturate the surface of the filler material;
   (2) adding to the product of stage (1) at least one compound of a transition metal of Group IVA, VA or VIA of the Periodic Table wherein the amount in moles, of the at least one compound of a transition metal does not exceed the amount, in moles, of the organic magnesium compound used in step 1(a) or 1(b);
   (3) effecting the polymerisation of at least one olefine monomer in the presence of (A) the product of stage (2) and also of (B) an organic compound of aluminium, an organic compound of a non-transition metal of Group IIA of the Periodic Table, or a complex of an organic compound of a non-transition metal of Group IA or IIA of the Periodic Table together with an organic aluminium compound; and
   (4) terminating the polymerisation when a sufficient quantity of the at least one olefine monomer has been polymerised for the proportion of the filler material to be at a desired level in the range from 10 up to 90% by weight of the composition.

2. The process of claim 1 wherein the organic magnesium compound is a material of general formula:

$$R_a^1 MgX_{(2-a)}$$

wherein
each $R^1$, which may be the same or different, is a hydrocarbon radical or an oxyhydrocarbon radical;
each X, which may be the same or different, is a halogen atom; and
a has a value such that $0 < a \leq 2$.

3. The process of claim 1 wherein a halogen-containing compound selected from hydrogen halides, boron halides, aluminium halides, halogens, interhalogen compounds and halides of elements of Groups IVB, VB or VIB of the Periodic Table is used in stage (1).

4. The process of claim 1 wherein the at least one transition metal compound used in stage (2) is titanium tetrachloride.

5. The process or claim 1 wherein the product of stage (1) is contacted with a Lewis Base compound before it is subjected to stage (2) and propylene is polymerised in stage (3) using, as component (B), an aluminium trialkyl compound together with an alkyl ester of an aromatic carboxylic acid.

6. A process for the production of a composite material comprising an ethylene polymer and mica, said process comprising the steps of
   (1) treating mica with an organic magnesium compound and in an amount of not more than 0.1 millimoles of the organic magnesium compound for each gramme of mica and then adding carbon tetrachloride in an amount of less than one mole of carbon tetrachloride for each mole of the organic magnesium compound;
   (2) adding to the product of stage (1), titanium tetrachloride in an amount of less than one mole of titanium tetrachloride for each mole of the organic magnesium compound;
   (3) effecting the polymerisation of ethylene, or a mixture containing ethylene, in the presence of the product of stage (2) and also of an aluminium trialkyl; and
   (4) terminating polymerisation when the proportion of mica in the composition formed is in the range from 35 up to 75% by weight of the composition.

7. A process for the production of a composite material comprising a propylene polymer and mica which comprises the steps of
   (1) treating mica with an organic magnesium compound in an amount of not more than 0.6 millimoles of the organic magnesium compound for each gramme of mica, then adding boron trichloride in an amount of from one up to two moles of boron trichloride for each mole of the organic magnesium compound, and then adding an alkyl ester of an aromatic carboxylic acid in an amount of from 0.1 up to 0.2 moles of the ester for each mole of the organic magnesium compound;
   (2) adding to the product of stage (1), titanium tetrachloride in an amount of from 0.1 up to 0.2 moles of the titanium tetrachloride for each mole of the organic magnesium compound;
   (3) effecting the polymerisation of propylene in the presence of the product of stage (2) and also of an aluminium trialkyl and an alkyl ester of an aromatic carboxylic acid wherein there are used from 0.2 up to 0.4 moles of the ester for each mole of the aluminium trialkyl; and (4) terminating polymerisation when the proportion of mica in the composition formed is in the range from 35 up to 75% by weight of the composition.

8. A composition which comprises an olefine polymer and a filler material which has been obtained by the process of claim 1.

9. The process of claim 1 wherein the organic magnesium compound is a material of general formula:

$R_a MgX_{(2-a)}$;

the halogen-containing compound if used in stage (1) is selected from hydrogen halides, boron halides, aluminium halides, halogens, interhalogen compounds and halides of elements of Groups IVB, VB or VIB of the Periodic Table; and the at least one transition metal compound used in stage (2) is titanium tetrachloride; wherein each $R^1$, which may be the same of different, is a hydrocarbon radical or an oxyhydrocarbon radical;

each X, which may be the same or different, is a halogen atom; and a has a value such that $O < a \leq 2$.

10. The process of claim 9 wherein the product of stage (1) is contacted with a Lewis Base compound before it is subjected to stage (2) and propylene is polymerised in stage (3) using as component (B), an aluminium trialkyl compound together with an alkyl ester of an aromatic carboxylic acid.

11. The process of claim 9 for the production of a composite material comprising an ethylene polymer and mica, said process comprising the steps of 1. treating mica with an organic magnesium compound and in an amount of not more than 0.1 millimoles of the organic magnesium compound for each gramme of mica and then adding a halogen-containing compound in an amount of less than one mole of the halogen-containing compound for each mole of the organic magnesium compound;

2. adding to the prdduct of stage (1), titanium tetrachloride in an amount of less than one mole of titanium tetrachloride for each mole of the organic magnesium compound;

3. effecting the polymerisation of ethylene, or a mixture containing ethylene, in the presence of the product of stage (2) and also of an aluminium trialkyl; and 4. terminating polymerisation when the proportion of mica in the composition formed is in the range from 35 up to 75% by weight of the composition.

* * * * *